(12) United States Patent
Matsumura et al.

(10) Patent No.: US 11,470,631 B2
(45) Date of Patent: Oct. 11, 2022

(54) TERMINAL, METHOD, AND SYSTEM FOR BEAM FAILURE RECOVERY

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/259,381

(22) PCT Filed: Jul. 12, 2018

(86) PCT No.: PCT/JP2018/026394
§ 371 (c)(1),
(2) Date: Jan. 11, 2021

(87) PCT Pub. No.: WO2020/012619
PCT Pub. Date: Jan. 16, 2020

(65) Prior Publication Data
US 2021/0282168 A1 Sep. 9, 2021

(51) Int. Cl.
*H04L 12/24* (2006.01)
*H04L 5/00* (2006.01)
(Continued)

(52) U.S. Cl.
CPC ....... *H04W 72/1273* (2013.01); *H04L 5/0048* (2013.01); *H04L 41/0654* (2013.01); *H04L 41/0677* (2013.01)

(58) Field of Classification Search
CPC ...... H04B 7/024; H04B 7/0695; H04B 7/088; H04L 41/0654; H04L 41/0677; H04L 5/0048; H04W 72/1273
See application file for complete search history.

(56) References Cited

U.S. PATENT DOCUMENTS

2019/0379506 A1\* 12/2019 Cheng .................. H04W 72/042
2020/0260430 A1\* 8/2020 Grant .................... H04B 7/086

FOREIGN PATENT DOCUMENTS

WO 2018/083624 A1 5/2018

OTHER PUBLICATIONS

International Search Report issued in Application No. PCT/JP2018/026394, dated Oct. 2, 2018 (5 pages).
(Continued)

*Primary Examiner* — Melvin C Marcelo
*Assistant Examiner* — Natali Pascual Peguero
(74) *Attorney, Agent, or Firm* — Osha Bergman Watanabe & Burton LLP

(57) ABSTRACT

To appropriately perform a Beam Failure Recovery (BFR) procedure even when communication is performed by using a plurality of transmission reception points in a future radio communication system, one aspect of a user terminal according to the present disclosure includes: a receiving section that receives one or more pieces of downlink control information and a first reference signal for beam failure detection, the one or more pieces of downlink control information being used to schedule downlink shared channels transmitted from a plurality of transmission reception points; and a control section that detects a beam failure of a transmission reception point associated with the first reference signal.

6 Claims, 17 Drawing Sheets

(51) Int. Cl.
*H04W 72/12* (2009.01)
*H04L 41/0654* (2022.01)
*H04L 41/0677* (2022.01)

(56) References Cited

OTHER PUBLICATIONS

Written Opinion issued in International Application No. PCT/JP2018/026394, dated Oct. 2, 2018 (4 pages).
3GPP TS 36.300 V14.5.0, Release 14; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Dec. 2017; Sophia Antipolis Valbonne, France (331 pages).
3GPP TSG RAN WG1 Meeting #88; R1-1702453; "Discussion on UE-initiated beam recovery;" LG Electronics; Feb. 13-17, 2017; Athens, Greece (4 pages).
3GPP TSG RAN WG1 Meeting #90; R1-1713813; "Multi-beam support for UE-specific NR-PDCCH;" ETRI; Aug. 21-25, 2017; Prague, P.R. Czechia (7 pages).
3GPP TSG RAN WG1 Meeting #90; R1-1712394; "Discussion on multi-beam operation for NR-PDCCH;" CATT; Aug. 21-25, 2017; Prague, Czechia (6 pages).
3GPP TSG RAN WG1 Meeting #93; R1-1807130; "Discussion on the multi-TRP/panel transmission in NR;" Huawei, HiSilicon; May 21-25, 2018; Busan, Korea (8 pages).
Chen Chih-Hsuan; "3GPP NR MIMO Introduction;" Industrial Technology Research Institute; Retrieved from the Internet: URL: http://std-share.itri.org.tw/Content/Files/Event/Files/2.3GPP NR MIMO introduction.pdf (27pages).
3GPP TSG RAN WG1 Meeting #92bis; R1-1804359; "Corrections on Beam Failure Recovery;" Samsung; Apr. 16-20, 2018; Sanya, China (6 pages).
Office Action issued in Russian Application No. 2021101576 dated Oct. 19, 2021 (8 pages).
3GPP TSG RAN WG1 NR Ad-hoc#2; R1-1710236 "Discussion on beam failure recovery procedure" Fujitsu; Qingdao, P.R. China; Jun. 27-30, 2017 (4 pages).
3GPP TSG-RAN WG2 #101bis; R2-1805957 "Impact of beam failure and recovery on RLM procedures" AT&T; Sanya, China; Apr. 16-20, 2018 (4 pages).
3GPP TSG RAN WG1 Meeting AH 1801; R1-1800700 "Remaining details and corrections for beam recovery" Ericsson; Vancouver, Canada; Jan. 22-26, 2018 (10 pages).
Extended European Search Report issued in European Application No. 18926046.6, dated Jan. 31, 2022 (12 pages).

\* cited by examiner

MULTI-PANEL

MULTI-TRP

TERMINAL, METHOD, AND SYSTEM FOR BEAM FAILURE RECOVERY

TECHNICAL FIELD

The present invention relates to a user terminal of a next-generation mobile communication system.

BACKGROUND ART

Legacy LTE systems (e.g., Rel. 8 to 14) perform Radio Link Monitoring (RLM) that is monitoring of radio link quality. When a Radio Link Failure (RLF) is detected by Radio Link Monitoring (RLM), re-establishment of Radio Resource Connection (RRC) connection is requested to a user terminal (UE: User Equipment).

CITATION LIST

Non-Patent Literature

Non-Patent Literature 1: 3GPP TS 36.300 V14.5.0 "Evolved Universal Terrestrial Radio Access (E-UTRA) and Evolved Universal Terrestrial Radio Access Network (E-UTRAN); Overall description; Stage 2 (Release 14)", December 2017

SUMMARY OF INVENTION

Technical Problem

To suppress an occurrence of a Radio Link Failure (RLF), it is studied for a future radio communication system (e.g., New Radio (NR)) to perform a procedure of switching a beam to another beam when quality of a specific beam worsens.

It is studied for future radio communication systems (e.g., Rel. 16 and subsequent releases) to transmit non-coherent transmission DL signals (e.g., Physical Downlink Shared Channels (PDSCHs)) in a coordinated manner from a plurality of transmission points.

A Beam Failure Recovery (BFR) procedure needs to be reviewed for a scenario that PDSCHs are transmitted from a plurality of transmission points.

The present invention has been made in light of this point, and one of objects of the present invention is to provide a user terminal that can appropriately perform a Beam Failure Recovery (BFR) procedure even when performing communication by using a plurality of transmission points in a future radio communication system.

Solution to Problem

One aspect of a user terminal according to the present invention includes: a receiving section that receives one or more pieces of downlink control information and a first reference signal for beam failure detection, the one or more pieces of downlink control information being used to schedule downlink shared channels transmitted from a plurality of transmission/reception points; and a control section that detects a beam failure of a transmission/reception point associated with the first reference signal.

Advantageous Effects of Invention

According to the present invention, it is possible to appropriately perform a Beam Failure Recovery (BFR) procedure even when performing communication by using a plurality of transmission points in a future radio communication system.

DESCRIPTION OF EMBODIMENTS

It is studied for future radio communication systems (e.g., 5G, 5G+, NR and Rel. 15 and subsequent releases) to perform communication by using Beam Forming (BF). To improve quality of communication that uses Beam Forming (BF), it is studied to control at least one of transmission and reception of a signal by taking into account a relationship of a Quasi-Co-Location (QCL) (QCL relationship) between a plurality of signals.

The Quasi-Co-Location (QCL) is an index that indicates a statistical property of a channel. When, for example, a certain signal or channel and another signal or channel have a Quasi-Co-Location (QCL) relationship, the QCL relationship may mean that it is possible to assume that at least one of a doppler shift, a doppler spread, an average delay, a delay spread and a spatial parameter (e.g., spatial reception parameter) is identical, i.e., the QCL holds for at least one of these parameters between a plurality of these different signals or channels.

The spatial reception parameter may be associated with a reception beam (e.g., reception analog beam) of a user terminal, and a beam may be specified based on spatial Quasi-Co-Location (QCL). The Quasi-Co-Location (QCL) or at least one element of the Quasi-Co-Location (QCL) in the present disclosure may be read as spatial QCL (sQCL).

When Beam Forming (BF) is used, a beam is more susceptible to an influence of blockage due to an obstacle, and therefore there is a risk that radio link quality worsens, and a Radio Link Failure (RLF) frequently occurs. When the Radio Link Failure (RLF) occurs, reconnection with a cell needs to be established. Therefore, the frequent occurrence of the Radio Link Failure (RLF) causes a decrease in a system throughput.

To prevent an occurrence of a Radio Link Failure (RLF), it is studied for the future radio communication system (e.g., NR) to perform a procedure of switching a beam to another beam when quality of a specific beam worsens. The procedure of switching the beam to the another beam may be referred to as Beam Recovery (BR), Beam Failure Recovery (BFR) or Layer 1/Layer 2 (L1/L2) beam recovery. The Beam Failure Recovery (BFR) procedure may be referred to simply as BFR.

A beam failure in the present disclosure may be referred to as a link failure.

Figure 1:
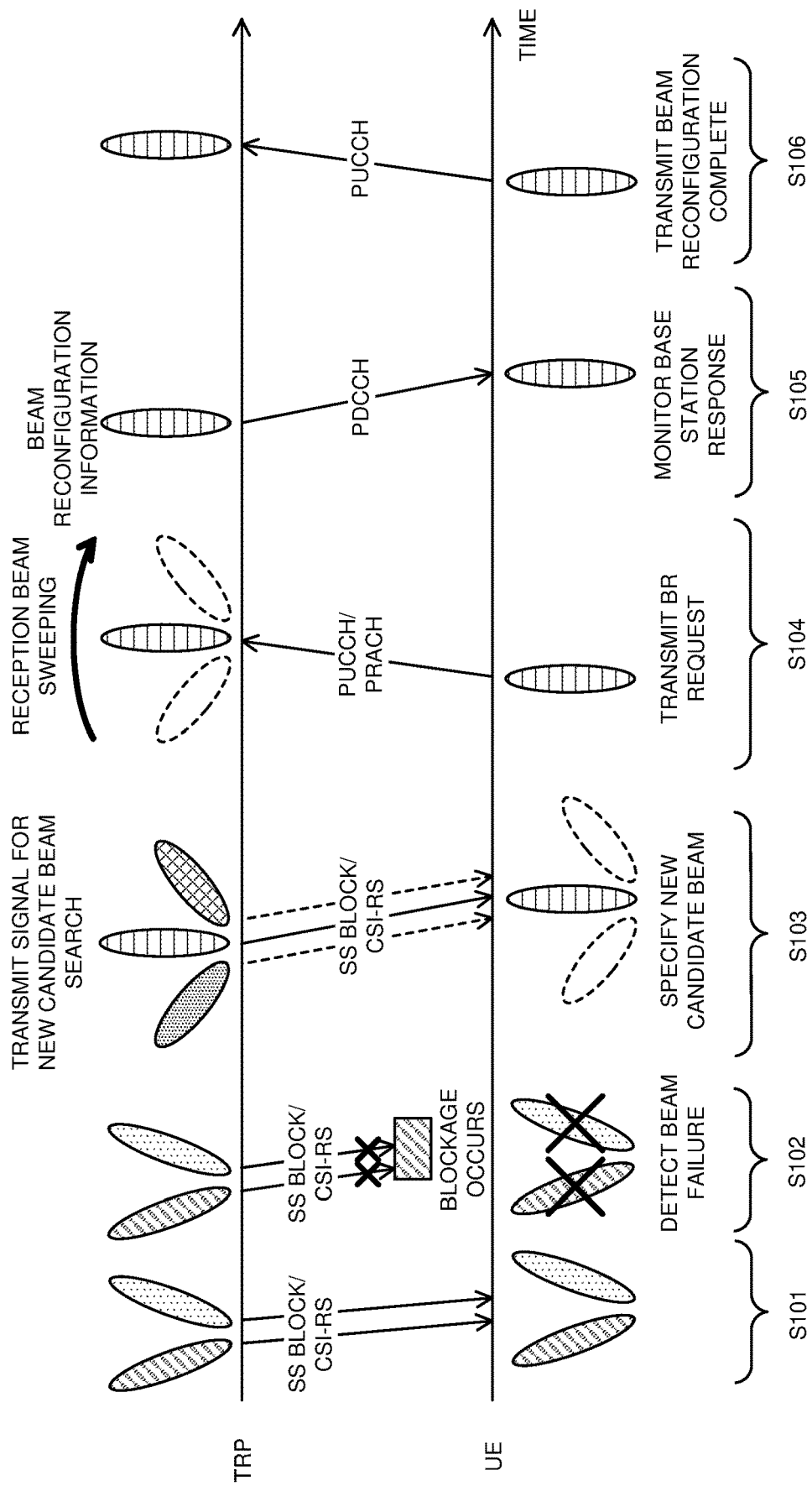
FIG. 1 is a diagram illustrating one example of a beam recovery procedure according to Rel. 15 NR.

FIG. 1 is a diagram illustrating one example of a beam recovery procedure according to Rel. 15 NR. The number of beams illustrated in FIG. 1 is one example, and is not limited to this.

In an initial state (step S101) in FIG. 1, the user terminal (UE) performs measurement based on a Reference Signal (RS) resource that is transmitted from a Transmission Reception Point (TRP) by using two beams. The reference signal may be at least one of a Synchronization Signal Block (SSB) and a Channel State Information Reference Signal (CSI-RS). The Synchronization Signal Block (SSB) may be referred to as an SS/Physical Broadcast Channel (PBCH) block.

The reference signal may be at least one of a Primary Synchronization Signal (PSS: Primary SS), a Secondary Synchronization Signal (SSS: Secondary SS), a Mobility Reference Signal (MRS: Mobility RS), a Synchronization Signal Block (SSB), a signal included in the SSB, a CSI-RS, a DeModulation Reference Signal (DMRS: Demodulation RS) and a beam-specific signal, or signals that are configured by expanding or changing these signals. The reference signal measured in step S101 may be referred to as a Beam Failure Detection Reference Signal (BFD-RS: Beam Failure Detection RS).

In step S102 in FIG. 1, a radio wave from the Transmission Reception Point (TRP) is blocked, and therefore the user terminal (UE) cannot detect the Beam Failure Detection Reference Signal (BFD-RS). This blockage occurs due to an influence of, for example, an obstacle between the user terminal and the Transmission Reception Point (TRP), a fading or an interference.

When a given condition is satisfied, the user terminal (UE) detects a beam failure. When, for example, Block Error Rates (BLER) of all of configured Beam Failure Detection Reference Signals (BFD-RSs) (BFD-RS resource configurations) are less than a threshold, the user terminal may detect an occurrence of a beam failure. When the occurrence of the beam failure is detected, a lower layer (physical layer) of the user terminal may give notification of (indicate) a beam failure instance to a higher layer (MAC layer).

Criteria to decide an occurrence of a beam failure are not limited to the BLER, and may be reference signal received power in the physical layer (L1-RSRP: L1-RS Received Power). Instead of Reference Signal (RS) measurement or in addition to the Reference Signal (RS) measurement, a beam failure may be detected based on a downlink control channel (PDCCH: Physical Downlink Control Channel). It may be expected that the Beam Failure Detection Reference Signal (BFD-RS) is in Quasi-Co-Location (QCL) with a DMRS of a PDCCH monitored by the user terminal.

Information related to Beam Failure Detection Reference Signals (BFD-RSs) such as indices, resources, the number, the number of ports and precoding of the reference signals, and information related to Beam Failure Detection (BFD) such as the above-described threshold may be configured (notified) to the user terminal (UE) by using a higher layer signaling. The information related to the Beam Failure Detection Reference Signals (BFD-RSs) may be referred to as information related to BFR resources.

The higher layer signaling may be one or a combination of, for example, a Radio Resource Control (RRC) signaling, a Medium Access Control (MAC) signaling and broadcast information.

When receiving a beam failure instance notification from the physical layer of the user terminal, the MAC layer of the user terminal (UE) may start a given timer. The given timer may be referred to as a beam failure detection timer. When receiving the beam failure instance notification a certain number of times (e.g., beamFailureInstanceMaxCount configured by RRC) or more until the given timer expires, the MAC layer of the user terminal may trigger Beam Failure Recovery (BFR) (for example, the MAC layer may start one of random access procedures described below).

When receiving no notification from the user terminal (UE), or when receiving a given signal (a beam failure recovery request in step S104) from the user terminal, the Transmission Reception Point (TRP) may decide that the user terminal has detected the beam failure.

In step S103 in FIG. 1, the user terminal (UE) starts searching new candidate beams used for new communication to perform beam recovery. The user terminal may select the new candidate beam associated with a given Reference Signal (RS) by measuring the given Reference Signal (RS). The Reference Signal (RS) measured in step S103 may be referred to as a New Candidate Beam Identification Reference Signal (NCBI-RS: New Candidate Beam Identification RS). The New Candidate Beam Identification Reference Signal (NCBI-RS) may be the same as or may be different from the Beam Failure Detection Reference Signal (BFD-RS). The new candidate beam may be may be referred to simply as a candidate beam.

The user terminal (UE) may determine a beam associated with a Reference Signal (RS) that satisfies the given condition as the new candidate beam. For example, the user terminal may determine the new candidate beam based on a Reference Signal (RS) whose reference signal received power in the physical layer (L1-RSRP) exceeds the threshold among the configured New Candidate Beam Identification Reference Signals (NCBI-RSs). The criteria to determine the new candidate beam are not limited to the L1-RSRP. The L1-RSRP related to the Synchronization Signal Block (SSB) may be referred to as SS-RSRP. The L1-RSRP related to the CSI-RS may be referred to as CSI-RSRP.

Information related to the New Candidate Beam Identification Reference Signals (NCBI-RSs) such as resources, the number, the number of ports and precoding of the reference signals, and information related to New Candidate Beam Identification (NCBI) such as above-described threshold may be configured (notified) to the user terminal (UE) via a higher layer signaling. The information related to the New Candidate Beam Identification Reference Signals (NCBI-RSs) may be obtained by the user terminal based on the information related to the Beam Failure Detection Reference Signal (BFD-RS). The information related to the New Candidate Beam Identification Reference Signals (NCBI-RSs) may be referred to as information related to New Candidate Beam Identification (NCBI) resources.

The Beam Failure Detection Reference Signal (BFD-RS) and the New Candidate Beam Identification Reference Signal (NCBI-RS) may be read as a Radio Link Monitoring Reference Signal (RLM-RS: Radio Link Monitoring RS).

In step S104 in FIG. 1, the user terminal (UE) that has specified the new candidate beam transmits a Beam Failure Recovery reQuest (BFRQ) to the Transmission Reception Point (TRP). The Beam Failure Recovery reQuest (BFRQ) may be referred to as a beam recovery request signal or a beam failure recovery request signal.

The Beam Failure Recovery reQuest (BFRQ) may be transmitted by using at least one of, for example, an uplink control channel (PUCCH: Physical Uplink Control Channel), a random access channel (PRACH: Physical Random Access Channel), an uplink shared channel (PUSCH: Physical Uplink Shared Channel) and a configured grant PUSCH.

The Beam Failure Recovery reQuest (BFRQ) may include information of the new candidate beam specified in step S103. A resource for the Beam Failure Recovery reQuest (BFRQ) may be associated with the new candidate beam. The information of the beam may be notified by using a Beam Index (BI), a port index of a given reference signal, a resource index (e.g., CSI-RS Resource Indicator) and a Synchronization Signal Block (SSB) Resource Indicator (SSBRI).

According to the future radio communication system (e.g., Rel. 15 NR), Contention-Based BFR (CB-BFR) that is Beam Failure Recovery (BFR) based on a contention-based Random Access procedure, and Contention-Free BFR (CF-BFR) that is Beam Failure Recovery (BFR) based on a contention-free random access procedure are studied. According to CB-BFR and CF-BFR, the user terminal (UE) may transmit a preamble as the Beam Failure Recovery reQuest (BFRQ) by using a PRACH resource. The preamble may be referred to as a Random Access (RA) preamble, a random access channel (PRACH) or an RACH preamble.

According to beam failure recovery based on the contention-based random access procedure (CB-BFR), the user terminal (UE) may transmit a preamble that is selected at random from one or a plurality of preambles. According to beam failure recovery based on the contention-free random access procedure (CF-BFR), the user terminal may transmit a preamble that is allocated from the base station uniquely to the UE. According to CB-BFR, the base station may allocate an identical preamble to a plurality of user terminals. According to CF-BFR, the base station may allocate a preamble specifically to the user terminal.

Beam failure recovery based on the contention-based random access procedure (CB-BFR) may be referred to as Contention-Based PRACH-based BFR (CBRA-BFR: CB PRACH-based BFR). Beam failure recovery based on the contention-free random access procedure (CF-BFR) may be referred to as Contention-Free PRACH-based BFR (CFRA-BFR: CF PRACH-based BFR). CBRA-BFR may be referred to as BFR CBRA. CFRA-BFR may be referred to as BFR CFRA.

According to beam failure recovery based on the contention-based random access procedure (CB-BFR), when receiving a certain preamble as a Beam Failure Recovery reQuest (BFRQ), the base station may not be able to specify which user terminal has transmitted the certain preamble. By performing contention resolution from the Beam Failure Recovery reQuest (BFRQ) to beam reconfiguration complete, the base station can specify an identifier (e.g., C-RNTI) of the user terminal that has transmitted the certain preamble.

A signal (e.g., preamble) transmitted from the user terminal (UE) during the random access procedure may be assumed as a Beam Failure Recovery reQuest (BFRQ).

In any case of beam failure recovery based on the contention-based random access procedure (CB-BFR) and beam failure recovery based on the contention-free random access procedure (CF-BFR), information related to a PRACH resource (RA preamble) may be notified by a higher layer signaling (e.g., RRC signaling). For example, the information may include information that indicates an association between a detected DL-RS (beam) and the PRACH resource, or may associate a different PRACH resource with each DL-RS.

A beam failure may be detected by an MAC layer. Regarding beam failure recovery based on the contention-based random access procedure (CB-BFR), when receiving a PDCCH associated with the C-RNTI related to the own user terminal, the user terminal (UE) may decide that contention resolution has succeeded.

Random Access (RA) parameters of beam failure recovery based on the contention-based random access procedure (CB-BFR) and beam failure recovery based on the contention-free random access procedure (CF-BFR) may be configured from the same parameter set, or respectively different values may be configured to the random access parameters.

For example, a parameter (ResponseWindowSize-BFR) that indicates a time duration for monitoring a gNB response in a beam failure recovery response CORESET after the Beam Failure Recovery reQuest (BFRQ) may be applied to only at least one of beam failure recovery based on the contention-based random access procedure (CB-BFR), and beam failure recovery based on the contention-free random access procedure (CF-BFR).

In step S105 in FIG. 1, the transmission reception point (e.g., base station) that has detected the Beam Failure Recovery reQuest (BFRQ) transmits a response signal to the Beam Failure Recovery reQuest (BFRQ) from the user terminal (UE). The response signal may be referred to as a gNB response. The response signal may include reconfiguration information (e.g., DL-RS resource configuration information) of one or a plurality of beams.

The response signal may be transmitted in, for example, a user terminal-common search space of a PDCCH. The response signal may be notified by using a PDCCH (DCI) or Downlink Control Information (DCI) whose Cyclic Redundancy Check (CRC) has been scrambled by an identifier of the user terminal such as a Cell-Radio Network Temporary Identifier (C-RNTI). The user terminal (UE) may decide at least one of a transmission beam and a reception beam to use based on the beam reconfiguration information.

The user terminal (UE) may monitor the response signal based on at least one of a Control REsource Set (CORESET) for Beam Failure Recovery (BFR) and a search space set for Beam Failure Recovery (BFR), for example.

Regarding beam failure recovery based on the contention-based random access procedure (CB-BFR), when receiving the PDCCH associated with the C-RNTI related to the own user terminal, the user terminal (UE) may decide that contention resolution has succeeded.

A duration during which the user terminal monitors a response from the Transmission Reception Point (TRP) to the Beam Failure Recovery reQuest (BFRQ) may be configured to processing in step S105. The duration may be referred to as, for example, a gNB response window, a gNB window or a beam failure recovery request response window.

When receiving no gNB response detected in the window duration, the user terminal (UE) may retransmit the Beam Failure Recovery reQuest (BFRQ).

In step S106 in FIG. 1, the user terminal (UE) may transmit to the Transmission Reception Point (TRP) a message indicating that a beam reconfiguration has been completed. The message may be transmitted on, for example, a PUCCH or a PUSCH.

A Beam Recovery success (BR success) may indicate, for example, a case where the flow reaches step S106. A Beam Recovery failure (BR failure) may correspond to, for example, a case where Beam Failure Recovery reQuest (BFRQ) transmission reaches a given number of times. The beam recovery failure may correspond to a case where, for example, a beam failure recovery timer (Beam-failure-recovery-Timer) expires.

A number of each step in FIG. 1 is only a number for description, and a plurality of steps may be integrated, or an order of the steps may be rearranged. Whether or not to perform the Beam Failure Recovery (BFR) procedure may be configured to the user terminal (UE) via a higher layer signaling.

It is studied for future radio communication systems (e.g., Rel. 16 and subsequent releases) to transmit non-coherent transmission DL signals (e.g., PDSCHs) in a coordinated manner from a plurality of transmission points. Transmitting non-coherent transmission DL signals or DL channels in the coordinated manner from a plurality of transmission points is also referred to as Non-Coherent Joint Transmission (NCJT).

In this description, a Transmission Point (TP) may be read as a Transmission Reception Point (TRP), a panel or a cell.

Figure 2A:
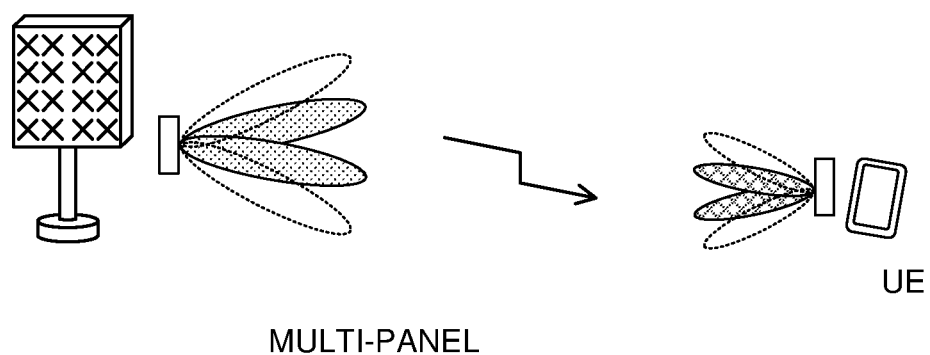
FIGS. 2A and 2B are diagrams illustrating one example of a case where PDSCHs are transmitted from a plurality of transmission points.
Figure 2B:
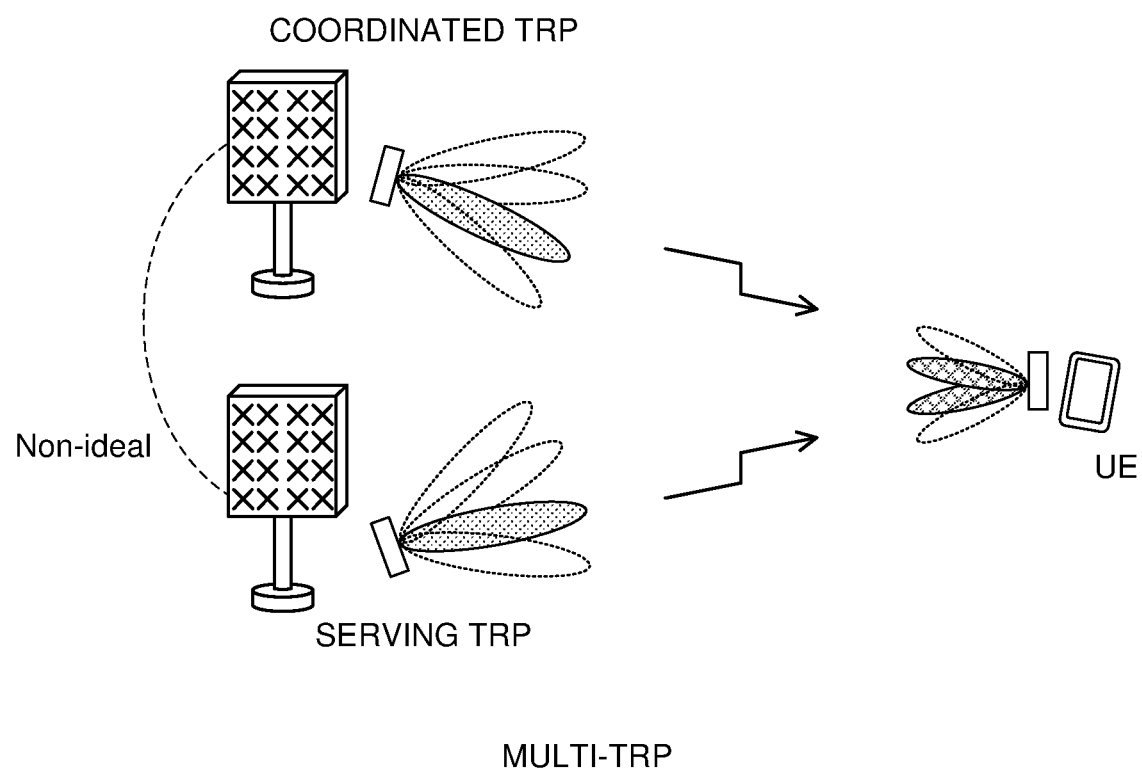

FIG. 2 is a diagram illustrating one example of a case where PDSCHs are transmitted from a plurality of transmission points. FIG. 2A illustrates a case where the PDSCHs (e.g., PDSCHs that use NCJT) are transmitted from a plurality of panels to the user terminal. FIG. 2B illustrates a case where the PDSCHs (e.g., the PDSCHs that use NCJT) are transmitted from a plurality of transmission reception points (a serving TRP and a coordinated TRP) to the user terminal.

Particularly in a case where backhaul between a plurality of Transmission Reception Points (TRPs) is non-ideal in a multi-panel transmission scenario illustrated in FIG. 2A and a multi-TRP transmission scenario illustrated in FIG. 2B, the Beam Failure Recovery (BFR) procedure needs to be reviewed.

In a non-ideal backhaul scenario, a Beam Failure Recovery reQuest (BFRQ) is transmitted when all resources for beam failure detection are less than a threshold in a certain duration according to the Beam Failure Recovery (BFR) procedure of above-described Rel. 15. Therefore, it is assumed that the user terminal loses connection with one Transmission Reception Point (TRP) for a long time before transmitting the Beam Failure Recovery reQuest (BFRQ).

In the multi-TRP transmission scenario, when connection with one transmission reception point (e.g., a TRP that is accompanied by broadcast information or RRC connection configuration) is lost, it is probable that connection with a network is lost. That is, the multi-TRP transmission scenario has a risk that waiting for the user terminal to detect link failures for a plurality of (e.g., two) Transmission Reception Points (TRPs) is too late.

Hence, the inventors of the present invention have specifically studied a Beam Failure Recovery (BFR) procedure in a scenario that non-coherent transmission DL signals are transmitted in a coordinated manner from a plurality of transmission points in the future radio communication systems (e.g., Rel. 16 and subsequent releases).

The present embodiment will be described in detail below with reference to the accompanying drawings.

The present embodiment will cite a multi-TRP transmission scenario that backhaul between a plurality of (e.g., two) Transmission Reception Points (TRPs) as illustrated in FIG. 2B is non-ideal as an example of a scenario that non-coherent transmission DL signals are transmitted in a coordinated manner from a plurality of transmission points in the future radio communication systems (e.g., Rel. 16 and subsequent releases). However, application of the present invention is not limited to the present embodiment.

(First Aspect)

The first aspect will describe beam failure detection of a Beam Failure Recovery (BFR) procedure in a scenario that non-coherent transmission DL signals are transmitted in a coordinated manner from a plurality of transmission points in future radio communication systems (e.g., Rel. 16 and subsequent releases).

(Aspect 1-1)

A plurality of independent Reference Signal (RS) configurations may be used to detect beam failures of a plurality of Transmission Reception Points (TRPs) in the Beam Failure Recovery (BFR) procedure.

Sets of a plurality of (e.g., two in two TRP transmission scenarios) beam failure detection reference signal resource configurations (e.g., Beam-Failure-Detection-RS-ResourceConfig) may be configured to a user terminal (UE) in a multi-panel transmission scenario and a multi-TRP transmission scenario based on a link reconfiguration procedure according to Rel. 15. Each set may be configured in association with a given Transmission Reception Point (TRP).

When a beam failure detection reference signal resource configuration (e.g., Beam-Failure-Detection-RS-ResourceConfig) that is a higher layer parameter is not provided to the user terminal (UE), the user terminal may determine two sets of $q_0$ (with an overline added to q).

$\bar{q}_0$ in this description is indicated by following equation (1). In this description, equation (1) will be expressed and described as "$q_0$ (with the overline added to q)".

$$\bar{q}_0 \qquad \text{Equation (1)}$$

Each set of $q_0$ (with an overline added to q) is associated with the given Transmission Reception Point (TRP). Each set includes an SS/PBCH block index and a periodic CSI-RS resource configuration index. These indices have the same values as those of Reference Signal (RS) indices in a Reference Signal (RS) set indicated by a Transmission Configuration Indicator (TCI) state of each control resource set where the user terminal is configured to monitor a PDCCH associated with one Transmission Reception Point (TRP).

Figure 3A:
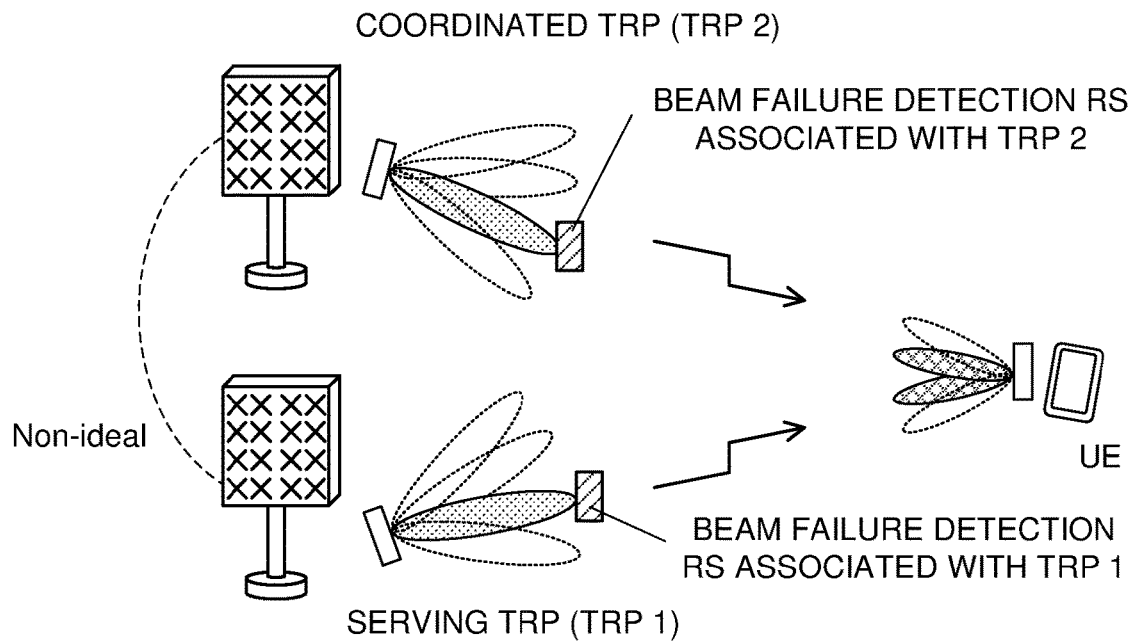
FIGS. 3A and 3B are diagrams that respectively correspond to aspect 1-1 or aspect 1-2, and illustrate one example of a Beam Failure Recovery (BFR) procedure in a multi-TRP transmission scenario.

FIG. 3A corresponds to aspect 1-1, and illustrates one example where 2 sets of beam failure detection reference signal resource configurations associated with each TRP are configured in the multi-TRP transmission scenario.

In FIG. 3A, a TRP 1 that is a serving TRP transmits a beam failure detection reference signal resource configuration associated with the TRP 1. A TRP 2 that is a coordinated TRP transmits a beam failure detection reference signal resource configuration associated with the TRP 2.

When all resources of one set for beam failure detection are less than a threshold in a certain duration, the user terminal (UE) detects a beam failure or a link failure of a corresponding Transmission Reception Point (TRP). The user terminal executes some link recovery procedure for the Transmission Reception Point (TRP) from which the user terminal has detected the failure.

(Aspect 1-2)

The Beam Failure Recovery (BFR) procedure may place a limitation to associate a beam failure detection Reference Signal (RS) configuration with only one panel or one TRP in the multi-panel transmission scenario and the multi-TRP transmission scenario.

A beam failure detection reference signal resource configuration (e.g., Beam-Failure-Detection-RS-ResourceConfig) that is a higher layer parameter may include only a reference signal associated with one transmission reception point (e.g., the serving TRP illustrated in FIG. 3B) based on the link reconfiguration procedure according to Rel. 15.

When the beam failure detection reference signal resource configuration (e.g., Beam-Failure-Detection-RS-ResourceConfig) that is the higher layer parameter is not provided to the user terminal (UE), the user terminal may determine a set of $q_0$ (with the overline added to q).

The set of $q_0$ (with the overline added to q) is associated with the Transmission Reception Point (TRP). Each set includes an SS/PBCH block index and a periodic CSI-RS resource configuration index. These indices have the same values as those of Reference Signal (RS) indices in a Reference Signal (RS) set indicated by a TCI state of each control resource set where the user terminal is configured to monitor a PDCCH associated with one Transmission Reception Point (e.g., the serving TRP illustrated in FIG. 3B).

Figure 3B:
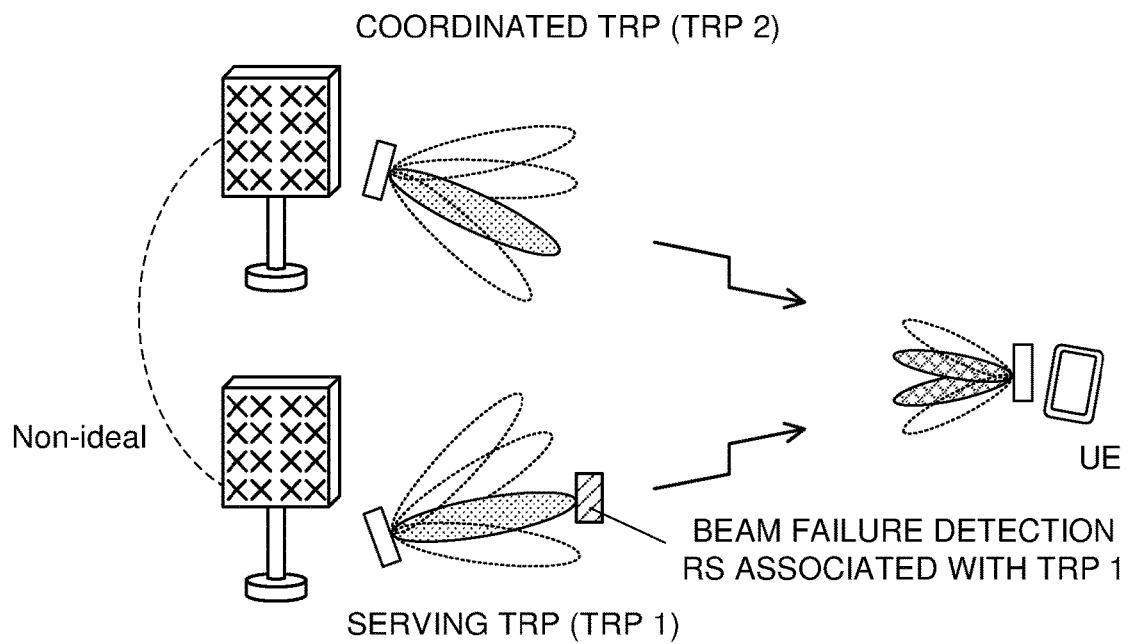

FIG. 3B corresponds to aspect 1-2, and illustrates one example where a set of a beam failure detection reference signal resource configurations associated with the serving TRP is configured in the multi-TRP transmission scenario.

In FIG. 3B, the TRP 1 that is the serving TRP transmits a beam failure detection reference signal resource configuration associated with only the serving TRP.

When all resources for beam failure detection are less than the threshold, the user terminal (UE) detects a beam failure or a link failure of the serving TRP based on the reference signal from the serving TRP. In this case, the user terminal triggers a link reconfiguration irrespectively of a link state of a coordinated TRP.

(Aspect 1-3)

A beam failure detection Reference Signal (RS) configuration in the multi-panel transmission scenario and the multi-TRP transmission scenario may include reference signals from a plurality of panels or TRPs based on the link reconfiguration procedure according to Rel. 15.

A beam failure detection reference signal resource configuration (e.g., Beam-Failure-Detection-RS-ResourceConfig) that is a higher layer parameter may include reference signals from a plurality of Transmission Reception Points (TRPs) based on the link reconfiguration procedure according to Rel. 15.

When the beam failure detection reference signal resource configuration (e.g., Beam-Failure-Detection-RS-ResourceConfig) that is the higher layer parameter is not provided to the user terminal (UE), the user terminal may determine a set of $q_0$ (with the overline added to q).

The set of $q_0$ (with the overline added to q) is associated with the Transmission Reception Point (TRP). Each set includes an SS/PBCH block index and a periodic CSI-RS resource configuration index. These indices have the same values as those of Reference Signal (RS) indices in a Reference Signal (RS) set indicated by a TCI state of each control resource set where the user terminal is configured to monitor PDCCHs associated with one or a plurality of Transmission Reception Points (TRPs).

Figure 4:
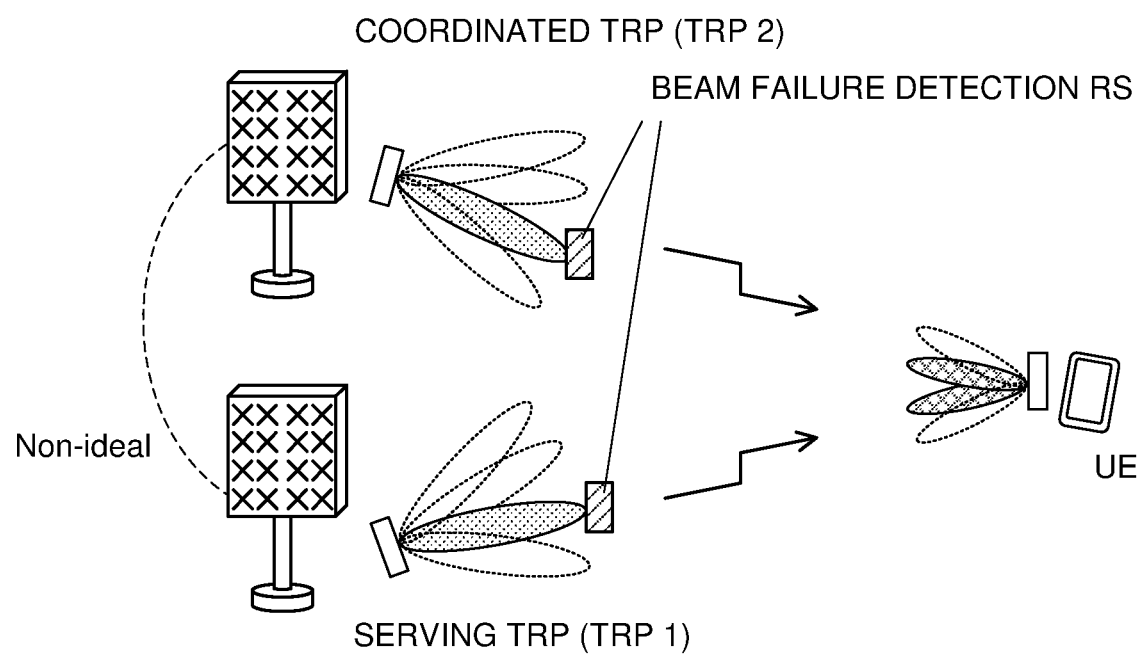
FIG. 4 is a diagram that corresponds to aspect 1-3, and illustrates one example of the Beam Failure Recovery (BFR) procedure in the multi-TRP transmission scenario.

FIG. 4 corresponds to aspect 1-3, and illustrates one example where a set of beam failure detection reference signal resource configurations associated with a plurality of TRPs is configured in the multi-TRP transmission scenario.

In FIG. 4, the TRP 1 that is the serving TRP and the TRP 2 that is the coordinated TRP transmit beam failure detection reference signal resource configurations including reference signals from the serving TRP and the coordinated TRP.

In this case, it is not necessary to change the link reconfiguration procedure according to Rel. 15. The user terminal detects a beam failure or a link failure based on the link reconfiguration procedure according to Rel. 15. Whether or not the beam failure detection reference signal resource configuration includes reference signals from one TRP or two TRPs may be transparent for the user terminal. That is, the user terminal may assume that the user terminal knows that the beam failure detection reference signal resource configuration includes the reference signals from the one TRP or the two TRPs. It may be assumed that this configuration is notified to the user terminal via a higher layer signaling from a network or by a combination of higher layer signalings or physical layer signalings from the network.

(Second Aspect)

The second aspect will describe new candidate beam detection of a Beam Failure Recovery (BFR) procedure in a scenario that non-coherent transmission DL signals are transmitted in a coordinated manner from a plurality of transmission points in future radio communication systems (e.g., Rel. 16 and subsequent releases).

(Aspect 2-1)

A plurality of independent Reference Signal (RS) configurations may be used for new candidate beam detection for a plurality of Transmission Reception Points (TRPs) in the Beam Failure Recovery (BFR) procedure.

Sets of a plurality of (e.g., two in two TRP transmission scenarios) new candidate beam detection reference signal resource configurations (e.g., Candidate-Beam-RS-List) may be configured to a user terminal (UE) in a multi-panel transmission scenario and a multi-TRP transmission scenario based on a link reconfiguration procedure according to Rel. 15. Each set may be configured in association with a given Transmission Reception Point (TRP).

FIG. 5 corresponds to aspect 2-1, and illustrates one example where 2 sets of new candidate beam detection reference signal resource configurations associated with each TRP are configured in the multi-TRP transmission scenario.

Figure 5A:
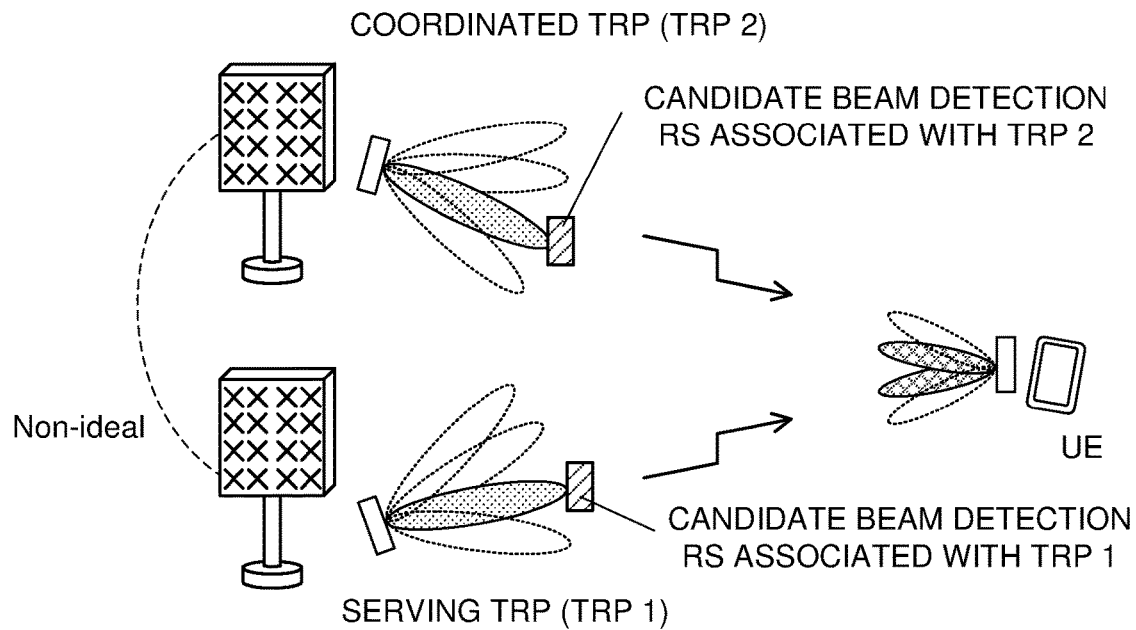
FIGS. 5A and 5B are diagrams that respectively correspond to aspect 2-1 or aspect 2-2, and illustrate one example of the Beam Failure Recovery (BFR) procedure in the multi-TRP transmission scenario.

In FIG. 5A, a TRP 1 that is a serving TRP transmits a new candidate beam detection reference signal resource configuration associated with the TRP 1. A TRP 2 that is a coordinated TRP transmits a new candidate beam detection reference signal resource configuration associated with the TRP 2.

The user terminal (UE) can measure a new candidate beam of each Transmission Reception Point (TRP). Consequently, the user terminal can execute beam reconfiguration and link reconfiguration subsequent to new candidate beam detection per Transmission Reception Point (TRP).

(Aspect 2-2)

The Beam Failure Recovery (BFR) procedure may place a limitation to associate a beam failure detection Reference Signal (RS) configuration with only one panel or one TRP in the multi-panel transmission scenario and the multi-TRP transmission scenario.

A new candidate beam detection reference signal resource configuration (e.g., Candidate-Beam-RS-List) that is a higher layer parameter may include only a reference signal associated with one transmission reception point (e.g., the serving TRP illustrated in FIG. 5B) based on the link reconfiguration procedure according to Rel. 15.

Figure 5B:
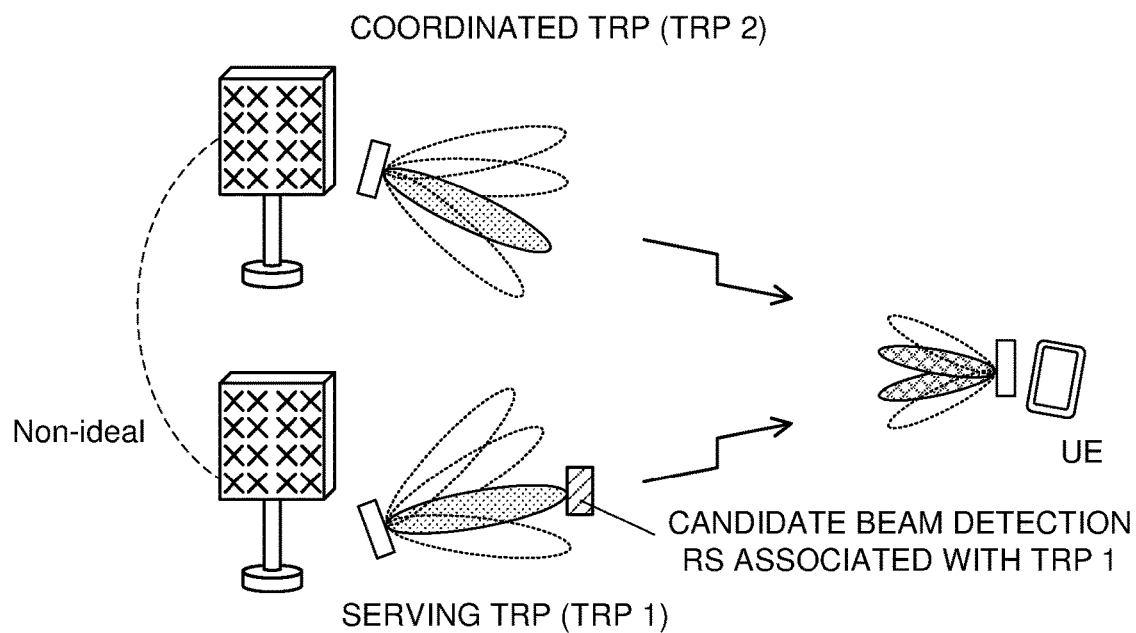

FIG. 5B corresponds to aspect 2-2, and illustrates one example where a new candidate beam detection reference signal resource configuration associated with the serving TRP is configured in the multi-TRP transmission scenario.

In FIG. 5B, the TRP 1 that is the serving TRP transmits a new candidate beam detection reference signal resource configuration associated with only the serving TRP.

The user terminal (UE) measures only the new candidate beam of the serving TRP based on a reference signal from the serving TRP. Consequently, the user terminal can execute beam reconfiguration and link reconfiguration subsequent to new candidate beam detection only in the serving TRP.

(Aspect 2-3)

A new candidate beam detection Reference Signal (RS) configuration in the multi-panel transmission scenario and the multi-TRP transmission scenario may include reference signals from a plurality of panels or TRPs based on the link reconfiguration procedure according to Rel. 15.

A new candidate beam detection reference signal resource configuration (e.g., Candidate-Beam-RS-List) that is a higher layer parameter may include reference signals from a plurality of Transmission Reception Points (TRPs) based on the link reconfiguration procedure according to Rel. 15.

Figure 6:
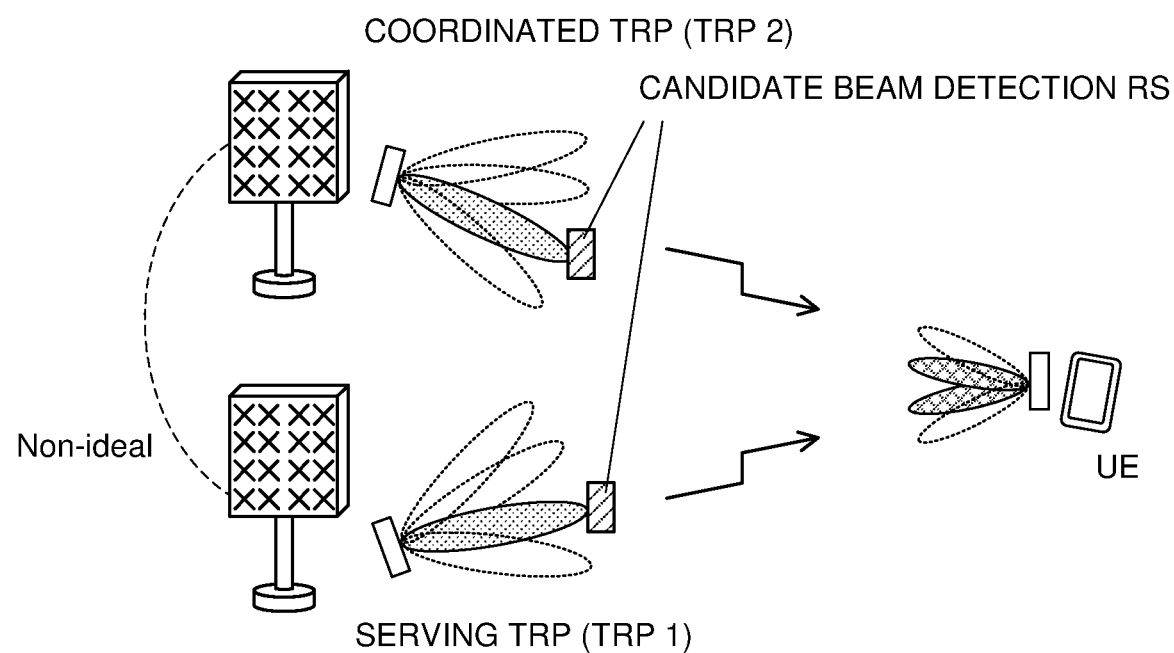
FIG. 6 is a diagram that corresponds to aspect 2-3, and illustrates one example of the Beam Failure Recovery (BFR) procedure in the multi-TRP transmission scenario.

FIG. 6 corresponds to aspect 2-3, and illustrates one example where new candidate beam detection reference signal resource configurations associated with a plurality of TRPs are configured in the multi-TRP transmission scenario.

In FIG. 6, the TRP 1 that is the serving TRP and the TRP 2 that is the coordinated TRP transmit new candidate beam detection reference signal resource configurations including reference signals from the serving TRP and the coordinated TRP.

In this case, it is not necessary to change the link reconfiguration procedure according to Rel. 15. The user terminal detects a new candidate beam based on the link reconfiguration procedure according to Rel. 15. Whether or not the new candidate beam detection reference signal resource configuration includes reference signals from one TRP or two TRPs may be transparent for the user terminal. That is, the user terminal may assume that the user terminal knows that the new candidate beam detection reference signal resource configuration includes the reference signals from the one TRP or the two TRPs. It may be assumed that this configuration is notified to the user terminal via a higher layer signaling from a network or by a combination of higher layer signalings or physical layer signalings from the network.

(Third Aspect)

The third aspect will describe Beam Failure Recovery reQuest (BFRQ) transmission in a Beam Failure Recovery (BFR) procedure in the scenario that non-coherent transmission DL signals are transmitted in a coordinated manner from a plurality of transmission points in future radio communication systems (e.g., Rel. 16 and subsequent releases).

(Aspect 3-1)

When a user terminal detects a beam failure or a link failure of one Transmission Reception Point (TRP) based on aspect 1-1, the user terminal may transmit a Beam Failure Recovery reQuest (BFRQ) or a link recovery request via another Transmission Reception Point (TRP).

A new MAC CE may be defined as a channel or a format of the Beam Failure Recovery reQuest (BFRQ) or the link recovery request transmitted via the another Transmission Reception Point (TRP), and transmitted via a PUSCH.

New Uplink Control Information (UCI) may be defined as the channel or the format of the Beam Failure Recovery reQuest (BFRQ) or the link recovery request transmitted via the another Transmission Reception Point (TRP), and transmitted via a PUCCH.

Contents of the Beam Failure Recovery reQuest (BFRQ) or the link recovery request transmitted via the another Transmission Reception Point (TRP) may include at least one of a TRP ID, a BWP ID and a new candidate beam ID (new TCI state instruction) of a Transmission Reception Point (TRP) in which a beam failure has been detected in addition to the Beam Failure Recovery reQuest (BFRQ) or the link recovery request.

Contents of the Beam Failure Recovery reQuest (BFRQ) or the link recovery request transmitted via the another Transmission Reception Point (TRP) may not include the TRP ID, the BWP ID and the new candidate beam ID (new TCI state instruction) of a Transmission Reception Point (TRP) in which a beam failure has been detected in addition to the Beam Failure Recovery reQuest (BFRQ) or the link recovery request.

When concurrently detecting beam failures or link failures at two Transmission Reception Points (TRPs), the user terminal (UE) transmits a Beam Failure Recovery reQuest (BFRQ) according to Rel. 15 to the serving TRP via a PRACH resource. An RRC configuration according to Rel. 15 needs to be retained on the PRACH resource for the Beam Failure Recovery reQuest (BFRQ).

Figure 7A:
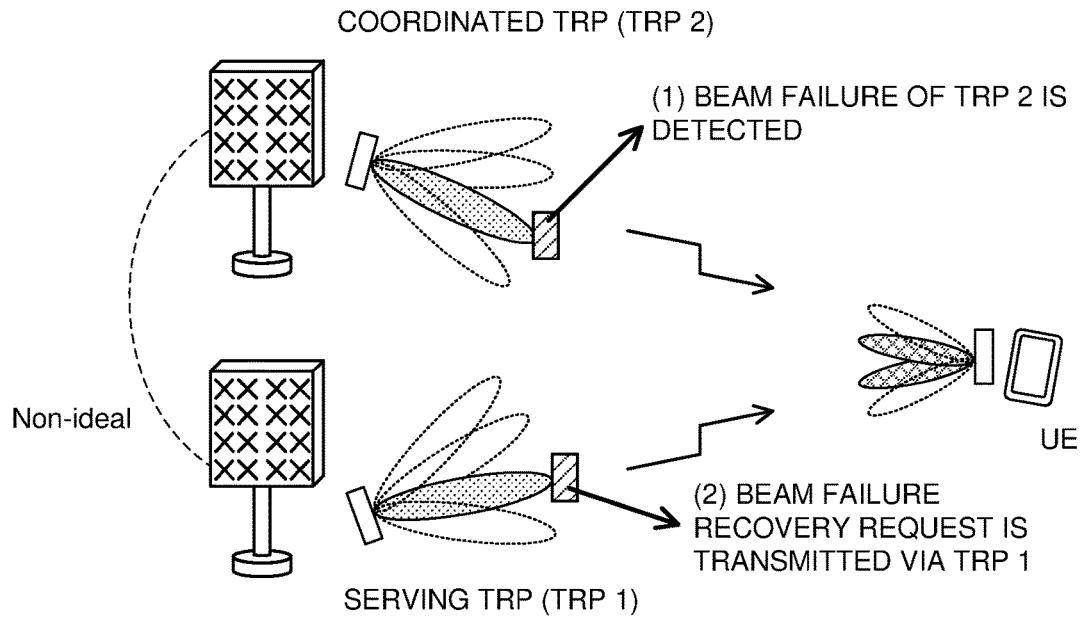
FIGS. 7A and 7B are diagrams that respectively correspond to aspect 3-1 or aspect 3-2, and illustrate one example of the Beam Failure Recovery (BFR) procedure in the multi-TRP transmission scenario.

FIG. 7A corresponds to aspect 3-1, and illustrates one example where 2 sets of beam failure detection reference signal resource configurations associated with each TRP are configured in the multi-TRP transmission scenario.

In FIG. 7A, the user terminal detects a beam failure or a link failure of a TRP 2 that is a coordinated TRP. The user terminal transmits a Beam Failure Recovery reQuest (BFRQ) or a link recovery request via the TRP 1 that is the serving TRP whose beam or link is functioning.

Even when failures occur in all beams or links of one Transmission Reception Point (TRP) in the multi-TRP transmission scenario, the user terminal has connection with another Transmission Reception Point (TRP), and so that it is possible to transmit a Beam Failure Recovery reQuest (BFRQ) by transmitting a new MAC CE or new UCI via the another TRP instead of a PRACH.

In the multi-TRP transmission scenario, only when all beams or links are not operating, the Beam Failure Recovery reQuest (BFRQ) according to Rel. 15 based on the PRACH may be used.

(Aspect 3-2)

When the user terminal detects a beam failure or a link failure of one Transmission Reception Point (TRP) based on aspect 1-1, the user terminal may transmit a Beam Failure Recovery reQuest (BFRQ) to a TRP at which a corresponding failure has occurred via a PRACH resource based on the configuration of the TRP.

RRC configures the PRACH resource transmitted from each TRP for the Beam Failure Recovery reQuest (BFRQ) of each Transmission Reception Point (TRP). Hence, in a case of the beam failure or the link failure of one Transmission Reception Point (TRP), the user terminal transmits a corresponding PRACH resource to the TRP at which the failure has occurred.

Figure 7B:
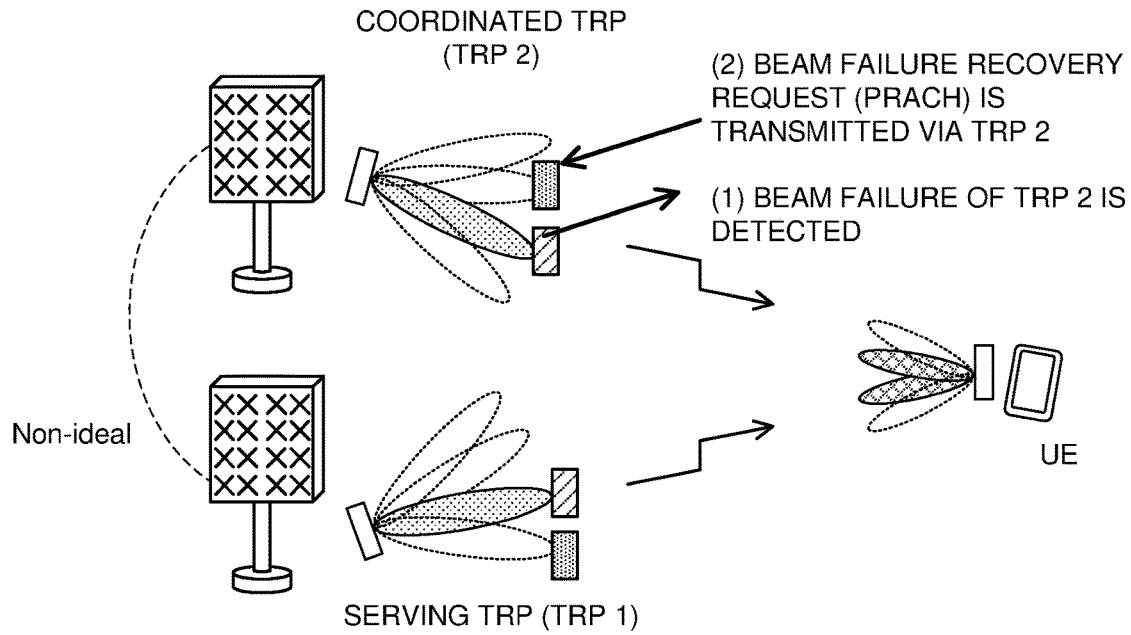

FIG. 7B corresponds to aspect 3-2, and illustrates one example where 2 sets of beam failure detection reference signal resource configurations associated with each TRP are configured in the multi-TRP transmission scenario.

RRC configures PRACH resources respectively transmitted from the serving TRP and the coordinated TRP for the Beam Failure Recovery reQuest (BFRQ) for the serving TRP and the coordinated TRP. These PRACH resources may be associated with new candidate beam detection reference signals.

For example, a new candidate beam detection reference signal RS 1 transmitted from the TRP 1 may be a PRACH 1 for a Beam Failure Recovery reQuest (BFRQ) transmitted from the TRP 1. A new candidate beam detection reference signal RS 2 transmitted from the TRP 1 may be a PRACH 2 for a Beam Failure Recovery reQuest (BFRQ) transmitted from the TRP 1. A new candidate beam detection reference signal RS 1 transmitted from the TRP 2 may be the PRACH 1 for a Beam Failure Recovery reQuest (BFRQ) transmitted from the TRP 2. The new candidate beam detection reference signal RS 2 transmitted from the TRP 2 may be the PRACH 2 for a Beam Failure Recovery reQuest (BFRQ) transmitted from the TRP 2.

When the user terminal detects a beam failure or a link failure of the TRP 2 that is the coordinated TRP in FIG. 7B, the user terminal transmits the Beam Failure Recovery reQuest (BFRQ) to the coordinated TRP via a PRACH resource based on a configuration of the coordinated TRP.

If the user terminal detects the beam failure or the link failure of the TRP 1 that is the serving TRP, the user terminal transmits the Beam Failure Recovery reQuest (BFRQ) to the serving TRP via a PRACH resource based on a configuration of the serving TRP.

(Aspect 3-3)

When detecting a beam failure or a link failure of one Transmission Reception Point (TRP) based on aspect 1-1, the user terminal may transmit a Beam Failure Recovery reQuest (BFRQ) according to Rel. 15 to the serving TRP via a PRACH resource.

RRC configures the PRACH resource transmitted from the serving TRP for the Beam Failure Recovery reQuest (BFRQ) to both of the serving TRP and the coordinated TRP.

Figure 8:
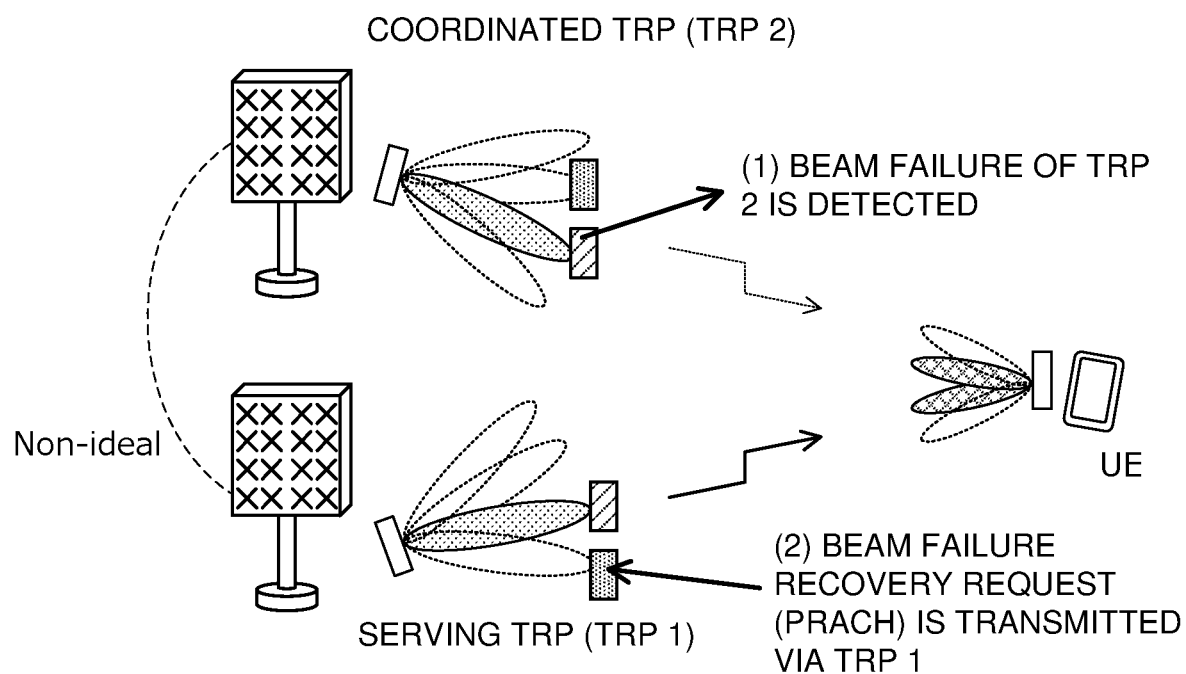
FIG. 8 is a diagram that corresponds to aspect 3-3, and illustrates one example of the Beam Failure Recovery (BFR) procedure in the multi-TRP transmission scenario.

FIG. 8 corresponds to aspect 3-3, and illustrates one example where 2 sets of beam failure detection reference signal resource configurations associated with each TRP are configured in the multi-TRP transmission scenario.

RRC configures a PRACH resource transmitted from the serving TRP for a Beam Failure Recovery reQuest (BFRQ) for the serving TRP and the coordinated TRP. These PRACH resources may be associated with the new candidate beam detection reference signals.

For example, the new candidate beam detection reference signal RS 1 transmitted from the TRP 1 may be the PRACH 1 for a Beam Failure Recovery reQuest (BFRQ) transmitted from the TRP 1 that is the serving TRP. The new candidate beam detection reference signal RS 2 transmitted from the TRP 1 may be the PRACH 2 for a Beam Failure Recovery reQuest (BFRQ) transmitted from the TRP 1. The new candidate beam detection reference signal RS 1 transmitted from the TRP 2 may be a PRACH 3 for the Beam Failure Recovery reQuest (BFRQ) transmitted from the TRP 1. The new candidate beam detection reference signal RS 2 transmitted from the TRP 2 may be a PRACH 4 for the Beam Failure Recovery reQuest (BFRQ) transmitted from the TRP 1.

In FIG. 8, when the user terminal detects a beam failure or a link failure of the TRP 1 that is the serving TRP, the user terminal transmits the Beam Failure Recovery reQuest (BFRQ) to the serving TRP via a PRACH resource based on an RRC configuration.

If the user terminal detects a beam failure or a link failure of the TRP 2 that is the coordinated TRP, the user terminal transmits the Beam Failure Recovery reQuest (BFRQ) to the serving TRP via the PRACH resource based on the RRC configuration.

(Aspect 3-4)

When the user terminal detects a beam failure or a link failure of the coordinated TRP based on aspect 1-1 and aspect 3-1, the user terminal may transmit a Beam Failure Recovery reQuest (BFRQ) or a link recovery request via the serving TRP. When the user terminal detects the beam failure or the link failure of the serving TRP, or when the user terminal concurrently detects beam failures or link failures of two TRPs, the user terminal may transmit the Beam Failure Recovery reQuest (BFRQ) according to Rel. 15 via a PRACH resource.

A channel or a format of the Beam Failure Recovery reQuest (BFRQ) or the link recovery request transmitted via another Transmission Reception Point (TRP) is similar to that of aspect 3-1.

Contents of the Beam Failure Recovery reQuest (BFRQ) or the link recovery request transmitted via the another Transmission Reception Point (TRP) does not need to include both or one of a TRP ID and a new candidate beam ID (new TCI state instruction) of a Transmission Reception Point (TRP) in which a beam failure has been detected.

An RRC configuration according to Rel. 15 needs to be retained on the PRACH resource for the Beam Failure Recovery reQuest (BFRQ).

Figure 9A:
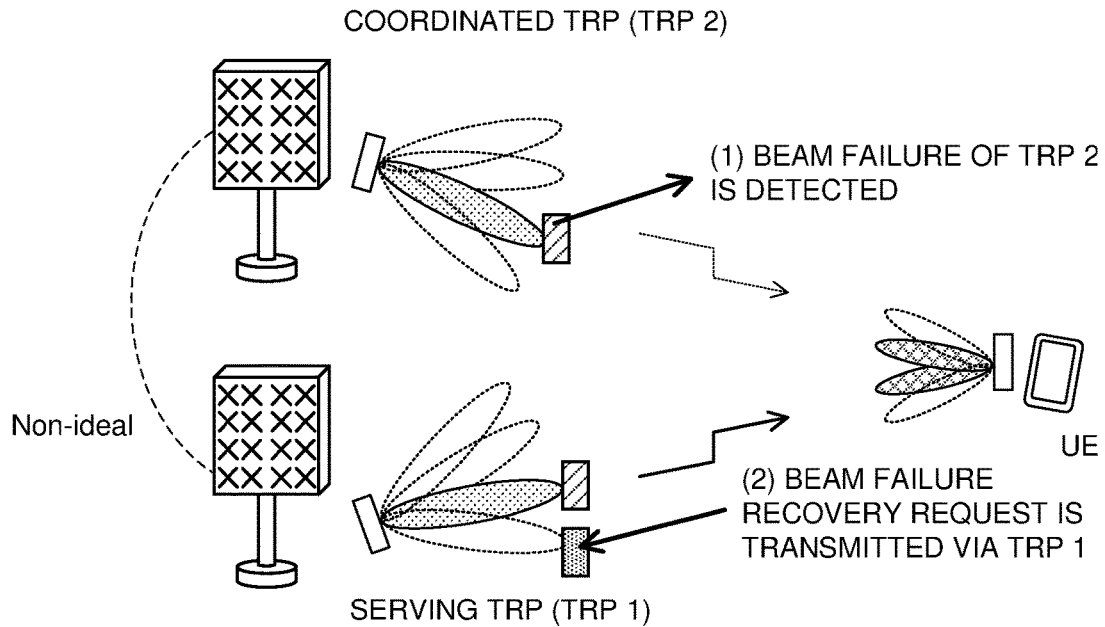
FIGS. 9A and 9B are diagrams that correspond to aspect 3-4, and illustrate one example of the Beam Failure Recovery (BFR) procedure in the multi-TRP transmission scenario.
Figure 9B:
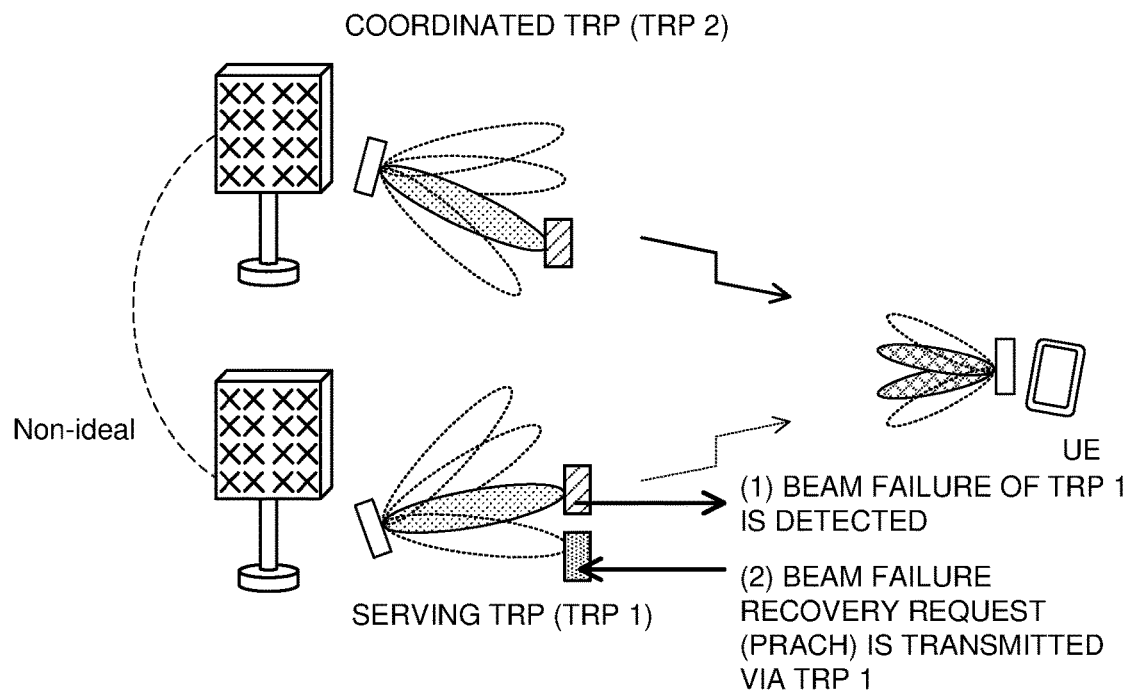

FIGS. 9A and 9B correspond to aspect 3-4, and illustrate one example where 2 sets of beam failure detection reference signal resource configurations associated with each TRP are configured in the multi-TRP transmission scenario.

RRC configures a PRACH resource transmitted from the serving TRP for the Beam Failure Recovery reQuest (BFRQ). This PRACH resource may be associated with a new candidate beam detection reference signal.

For example, the new candidate beam detection reference signal RS 1 transmitted from the TRP 1 may be the PRACH 1 for a Beam Failure Recovery reQuest (BFRQ) transmitted from the TRP 1. The new candidate beam detection reference signal RS 2 transmitted from the TRP 1 may be the PRACH 2 for a Beam Failure Recovery reQuest (BFRQ) transmitted from the TRP 1.

Assuming that the user terminal has only RRC connection with the serving TRP, when the user terminal detects a beam failure or a link failure of the coordinated TRP, the user terminal can transmit the Beam Failure Recovery reQuest (BFRQ) via the serving TRP by using a beam or a link in which a failure does not occur (see FIG. 9A). The Beam Failure Recovery reQuest (BFRQ) may include a new MAC CE or new UCI.

When it is assumed that the user terminal has only RRC connection with the serving TRP, and the user terminal detects a beam failure or a link failure of the serving TRP, this means that the user terminal loses connection with a network. In this case, the user terminal transmits the Beam Failure Recovery reQuest (BFRQ) according to Rel. 15 via a PRACH resource (see FIG. 9B).

(Fourth Aspect)

The fourth aspect will describe monitoring of a response signal to a Beam Failure Recovery reQuest (BFR) in a Beam Failure Recovery (BFR) procedure in a scenario that non-coherent transmission DL signals are transmitted in a coordinated manner from a plurality of transmission points in future radio communication systems (e.g., Rel. 16 and subsequent releases). The response signal may be referred to as a gNB response.

(Aspect 4-1)

RRC may configure a plurality of beam failure recovery response configurations (e.g., Beam-failure-Recovery-Response-CORESET/Search space configuration). Each configuration may be associated with one Transmission Reception Point (TRP) for monitoring the gNB response.

A user terminal determines an operation of monitoring the gNB response from a plurality of beam failure recovery response configurations after transmitting a Beam Failure Recovery reQuest (BFRQ).

The user terminal may monitor the gNB response from a beam failure recovery response configuration associated with a Transmission Reception Point (TRP) in which a beam failure or a link failure has occurred.

The user terminal may monitor the gNB response from a beam failure recovery response configuration associated with a Transmission Reception Point (TRP) in which a new candidate beam or a new TCI state for beam recovery transmission has been found.

The user terminal may monitor the gNB response from a beam failure recovery response configuration associated with a Transmission Reception Point (TRP) that has transmitted a Beam Failure Recovery reQuest (BFRQ) via a PRACH resource. This method is applicable only to a PRACH-based recovery request transmission mechanism.

When transmitting a new MAC CE or new UCI-based Beam Failure Recovery reQuest (BFRQ) via a beam or a link in which a failure does not occur, the user terminal can follow a last TCI configuration for PDCCH monitoring.

Only when transmitting the PRACH-based Beam Failure Recovery reQuest (BFRQ), the user terminal needs to configure the beam failure recovery response configuration (e.g., Beam-failure-Recovery-Response-CORESET/Search space configuration), and tracks the beam failure recovery response configuration for monitoring the gNB response.

(Aspect 4-2)

RRC may configure a beam failure recovery response configuration (e.g., Beam-failure-Recovery-Response-CORESET/Search space configuration) associated with a fixed TRP (e.g., serving TRP) to monitor the gNB response.

The user terminal always monitors the gNB response from the fixed TRP.

This method is applicable only to the PRACH-based recovery request transmission mechanism.

When transmitting a new MAC CE or new UCI-based Beam Failure Recovery reQuest (BFRQ) via a beam or a link in which a failure does not occur, the user terminal can follow a last TCI configuration for PDCCH monitoring.

Only when transmitting the PRACH-based Beam Failure Recovery reQuest (BFRQ), the user terminal needs to configure the beam failure recovery response configuration (e.g., Beam-failure-Recovery-Response-CORESET/Search space configuration), and tracks the beam failure recovery response configuration for monitoring the gNB response.

First Embodiment

The first embodiment will describe a Beam Failure Recovery (BFR) procedure that is a combination of aspect 1-2, aspect 2-2, aspect 3-3 and aspect 4-2.

A multi-panel transmission scenario or a multi-TRP transmission scenario may place a limitation to associate configurations of transmission of a Beam Failure Detection Reference Signal (BFD-RS), a New Candidate Beam Identification Reference Signal (NCBI-RS) and a Beam Failure Recovery reQuest (BFRQ) and monitoring of a gNB response with only one panel or one TRP.

Based on a link reconfiguration procedure according to Rel. 15, a beam failure detection reference signal resource configuration (e.g., Beam-Failure-Detection-RS-ResourceConfig) and a new candidate beam detection reference signal resource configuration (e.g., Candidate-Beam-RS-List) that are higher layer parameters include only reference signals associated with one TRP (e.g., serving TRP).

The beam failure detection reference signal resource configuration (e.g., Beam-Failure-Detection-RS-ResourceConfig) that is the higher layer parameter is not provided to the user terminal (UE), the user terminal may determine a set of $q_0$ (with an overline added to q). Each set of $q_0$ (with the overline added to q) includes an SS/PBCH block index and a periodic CSI-RS resource configuration index. These indices have the same values as those of Reference Signal (RS) indices in a Reference Signal (RS) set indicated by a TCI state of each control resource set where the user terminal is configured to monitor a PDCCH associated with one Transmission Reception Point (e.g., serving TRP).

The beam failure recovery response configuration (e.g., Beam-failure-Recovery-Response-CORESET/Search space configuration) that is the higher layer parameter may be also configured to be associated with one TRP (e.g., serving TRP).

Figure 10:
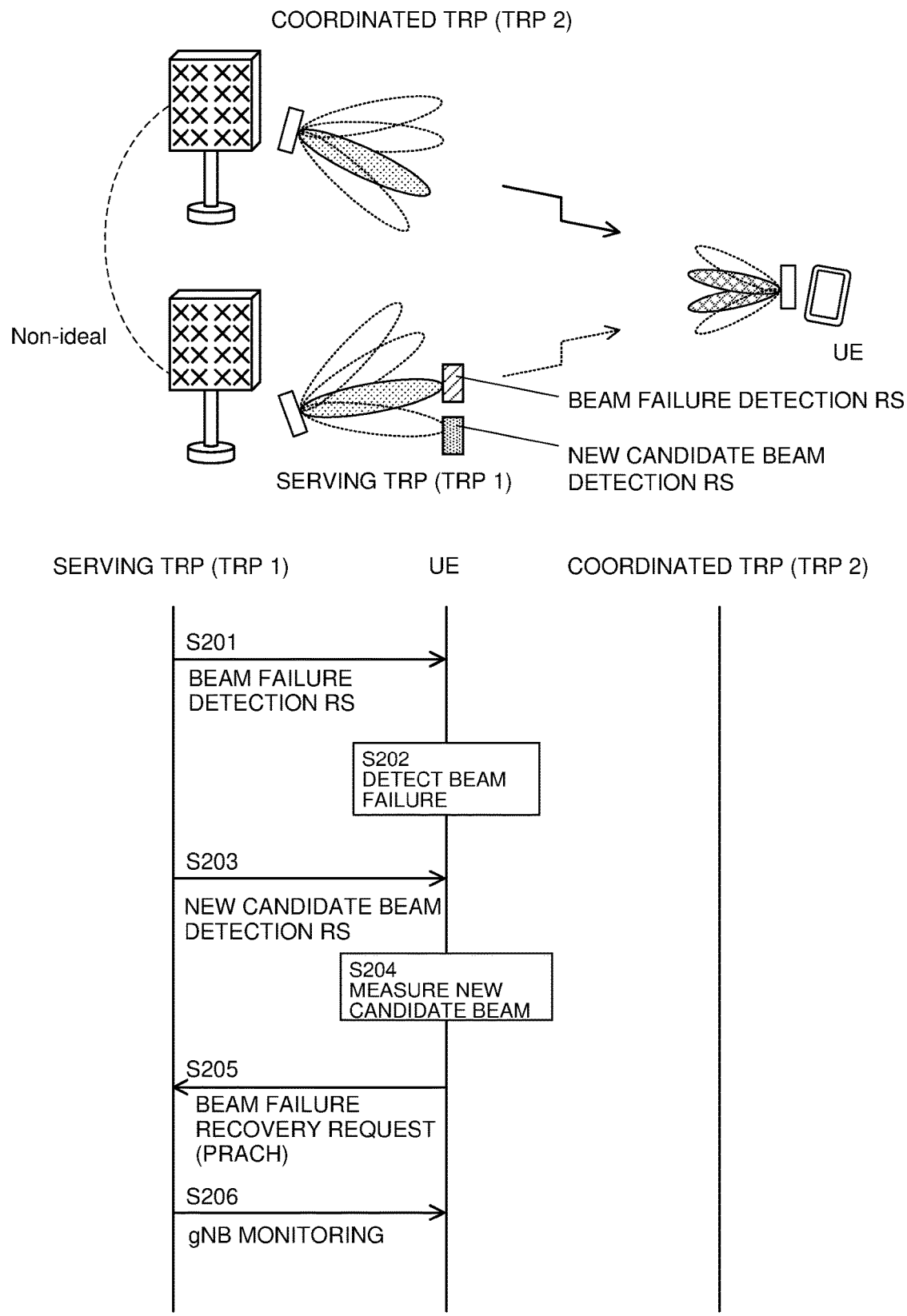
FIG. 10 is a diagram that corresponds to a first embodiment, and illustrates one example of the Beam Failure Recovery (BFR) procedure in the multi-TRP transmission scenario.

FIG. 10 corresponds to the first embodiment, and the beam failure detection reference signal resource configuration set and a new candidate beam detection reference signal resource configuration associated with the serving TRP are configured in a multi-TRP transmission scenario.

In FIG. 10, a TRP 1 that is the serving TRP transmits the beam failure detection reference signal resource configuration associated with only the serving TRP (step S201).

The user terminal detects a beam failure of the serving TRP based on a reference signal from the serving TRP (step S202).

The TRP 1 that is the serving TRP transmits the new candidate bean detection reference signal resource configuration associated with only the serving TRP (step S203).

The user terminal measures only new candidate beams of the serving TRP based on the reference signal from the serving TRP (step S204).

The user terminal transmits a Beam Failure Recovery reQuest (BFRQ) to the serving TRP via a PRACH resource (step S205). This PRACH resource may be associated with a new candidate beam detection Reference Signal (RS).

The user terminal may monitor a CORESET or a search space to monitor a gNB response from the serving TRP (step S206).

In this case, when detection of all resources for beam failure detection from the serving TRP fails, a link reconfiguration is triggered irrespectively of a link state of a coordinated TRP.

Second Embodiment

The second embodiment will describe a Beam Failure Recovery (BFR) procedure that is a combination of aspect 1-1, aspect 2-2, aspect 3-1 and aspect 4-1.

In a multi-panel transmission scenario or a multi-TRP transmission scenario, a plurality of independent Reference Signals (RSs) may be used to detect beam failures of a plurality of Transmission Reception Points (TRPs).

A new candidate beam configuration and a relevant PRACH configuration may be associated with a serving TRP.

When a user terminal detects a beam failure or a link failure of one Transmission Reception Point (TRP), the user terminal may transmit a Beam Failure Recovery reQuest (BFRQ) or a link recovery request to another Transmission Reception Point (TRP). A new MAC CE or UCI may be defined as the Beam Failure Recovery reQuest (BFRQ) or the link recovery request.

The user terminal may follow a last TCI configuration for PDCCH monitoring for another Transmission Reception Point (TRP).

A network may trigger a reporting of reference signal received power in a physical layer (L1-RSRP) of a Transmission Reception Point (TRP) in which a failure has occurred by transmitting an available PDCCH or PDSCH from another Transmission Reception Point (TRP). A TCI of the Transmission Reception Point (TRP) in which the failure has occurred may be reconfigured.

Only when concurrently detecting beam failures or link failures of two Transmission Reception Points (TRPs), the user terminal can transmit a Beam Failure Recovery reQuest (BFRQ) according to conventional Rel. 15 via a PRACH resource. Then, conventional gNB response monitoring is executed.

Figure 11:
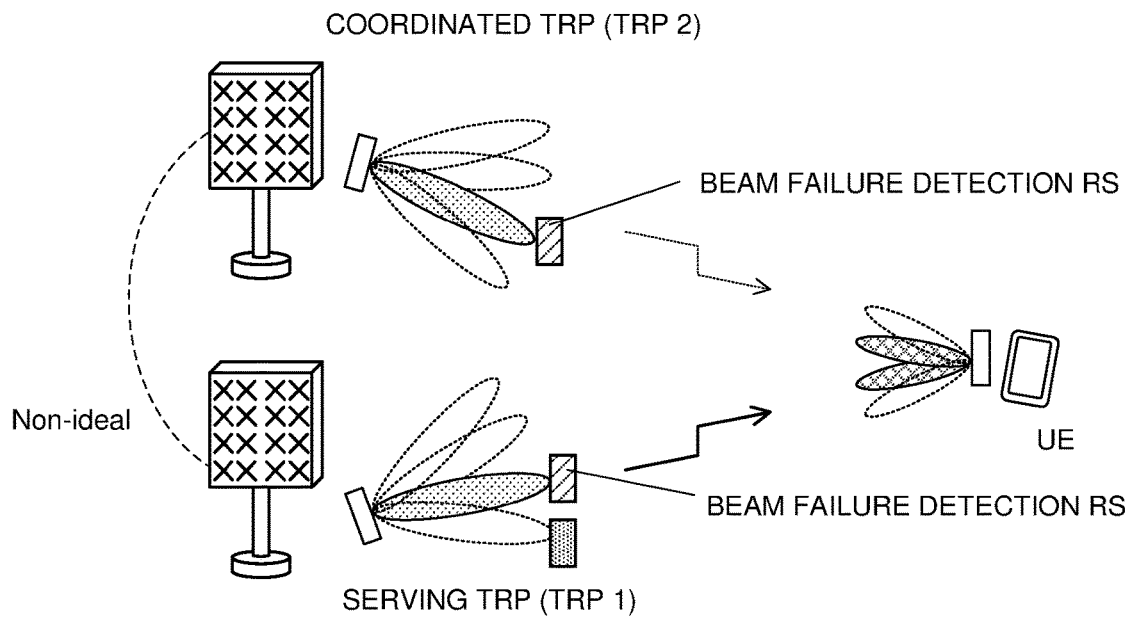
FIG. 11 is a diagram that corresponds to a second embodiment, and illustrates one example of the Beam Failure Recovery (BFR) procedure in the multi-TRP transmission scenario.
Figure 11:
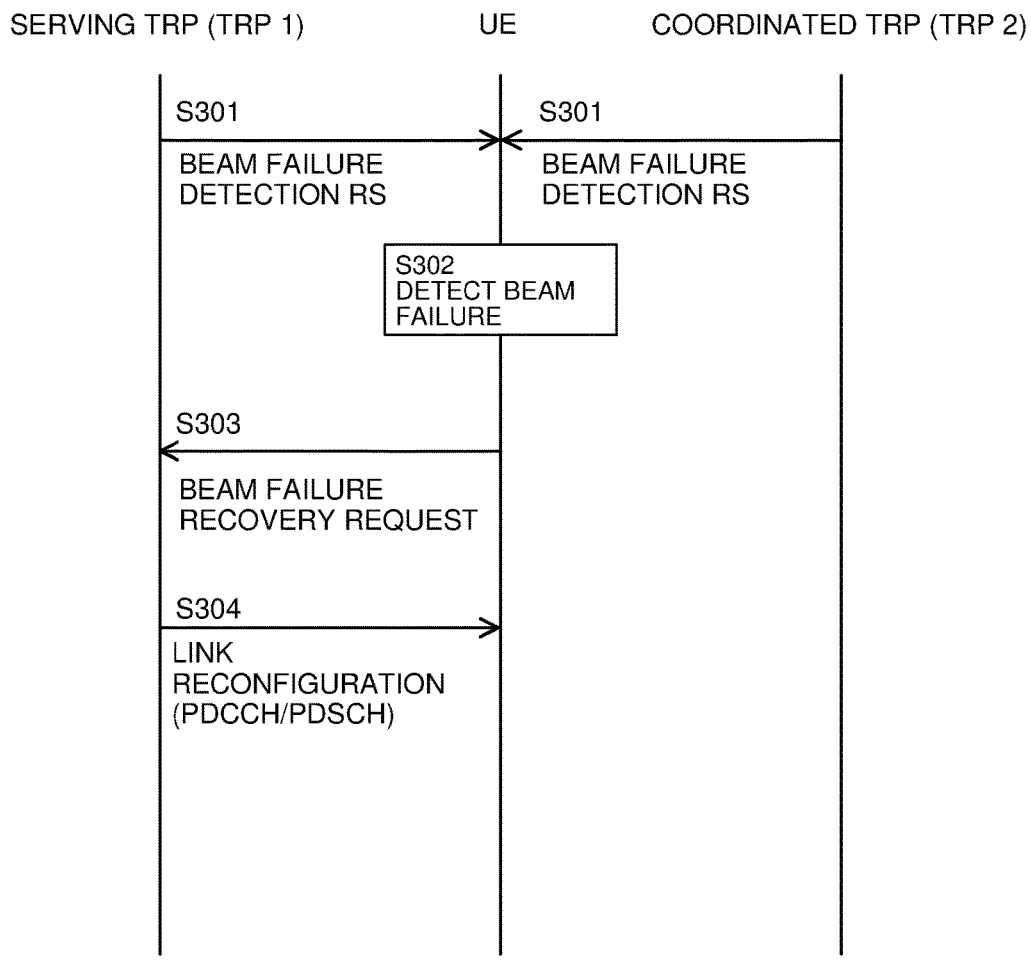

FIG. 11 corresponds to the second embodiment, and illustrates one example where 2 sets of beam failure detection reference signal resource configurations associated with each TRP are configured in a multi-TRP transmission scenario.

In FIG. 11, a TRP 1 that is a serving TRP and a TRP 2 that is a coordinated TRP transmit beam failure detection reference signal resource configurations associated with the respective TRPs (step S301).

The user terminal detects a beam failure of the coordinated TRP based on a reference signal from the coordinated TRP (step S302).

The user terminal transmits a Beam Failure Recovery reQuest (BFRQ) via the serving TRP in which a failure does not occur (step S303).

The user terminal receives a link reconfiguration of the coordinated TRP from the serving TRP via an available PDCCH or PDSCH (step S304).

In this case, even when the beam failure or the link failure occurs at one Transmission Reception Point (TRP), the user terminal has connection with another Transmission Reception Point (TRP). Consequently, the user terminal can transmit the Beam Failure Recovery reQuest (BFRQ) via the another Transmission Reception Point (TRP) together with a new MAC CE or UCI instead of a PRACH.

If beam failures or link failures occur at two Transmission Reception Points (TRPs), the user terminal transmits a PRACH-based Beam Failure Recovery reQuest (BFRQ) via the serving TRP.

As described above, according to the present embodiment, when communication is performed by using a plurality of transmission points in the future radio communication system, it is possible to appropriately perform the Beam Failure Recovery (BFR) procedure.

(Radio Communication System)

The configuration of the radio communication system according to the present embodiment will be described below. This radio communication system is applied the radio communication method according to the above embodiments.

Figure 12:
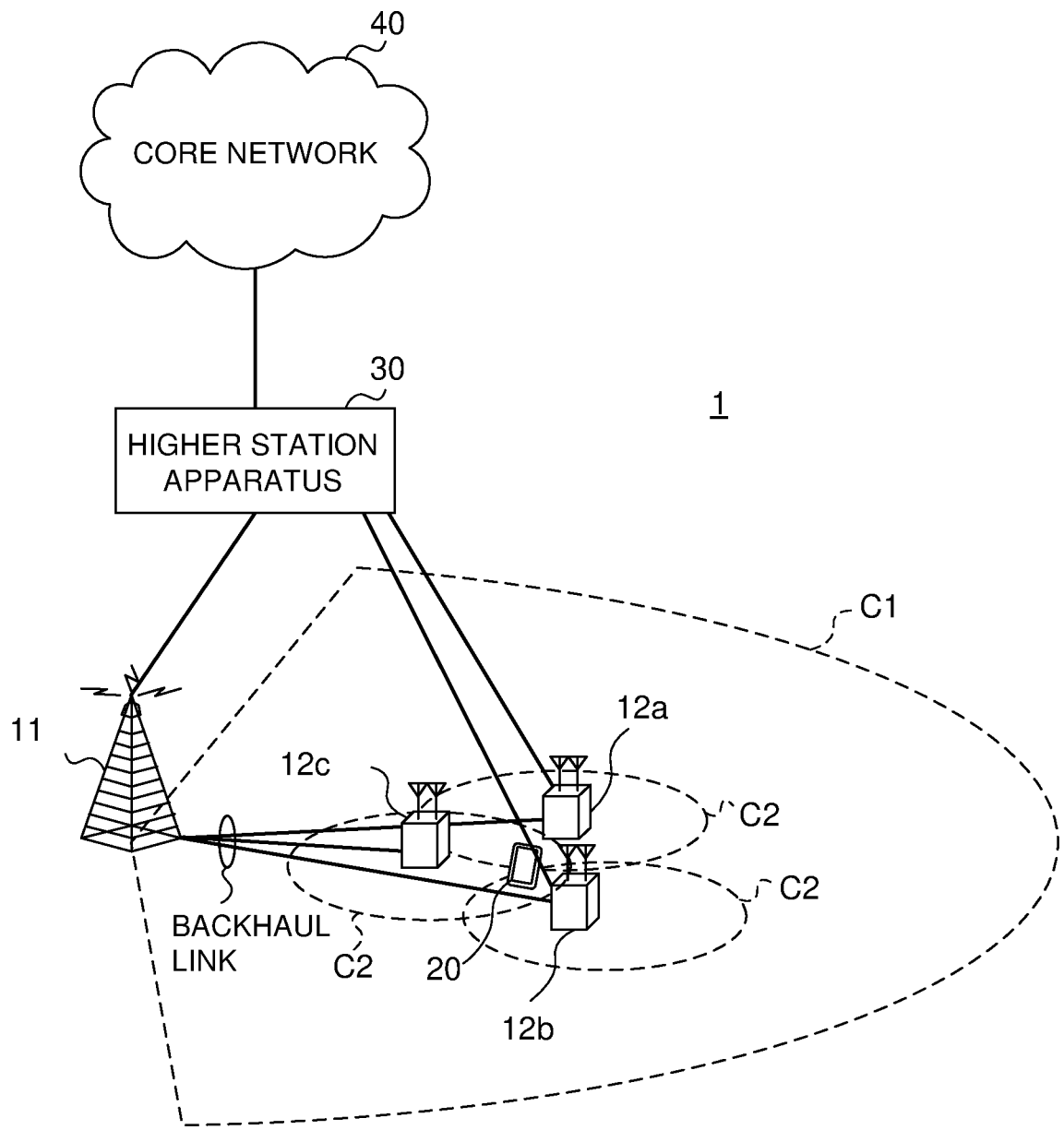
FIG. 12 is a diagram illustrating one example of a schematic configuration of a radio communication system according to the present embodiment.

FIG. 12 is a diagram illustrating one example of a schematic configuration of the radio communication system according to the present embodiment. A radio communication system 1 can apply Carrier Aggregation (CA) or Dual Connectivity (DC) that aggregates a plurality of base frequency blocks (component carriers) whose 1 unit is a system bandwidth (e.g., 20 MHz) of the LTE system. The radio communication system 1 may be referred to as SUPER 3G, LTE-Advanced (LTE-A), IMT-Advanced, 4G, 5G, Future Radio Access (FRA) or New RAT (NR).

The radio communication system 1 includes a base station 11 that forms a macro cell C1, and base stations 12a to 12c that are located in the macro cell C1 and form small cells C2 narrower than the macro cell C1. A user terminal 20 is located in the macro cell C1 and each small cell C2. Different numerologies may be configured to be applied between cells. The numerology refers to a communication parameter set that characterizes a signal design of a certain RAT or an RAT design.

The user terminal 20 can connect with both of the base station 11 and the base stations 12. The user terminal 20 is assumed to concurrently use the macro cell C1 and the small cells C2 that use different frequencies by Carrier Aggregation (CA) or Dual Connectivity (DC). The user terminal 20 can apply Carrier Aggregation (CA) or Dual Connectivity (DC) by using a plurality of cells (CCs) (e.g., two CCs or more). The user terminal can use licensed band CCs and unlicensed band CCs as a plurality of cells. One of a plurality of cells can be configured to include a TDD carrier to which a reduced TTI is applied.

The user terminal 20 and the base station 11 can communicate by using a carrier (referred to as a Legacy carrier) of a narrow bandwidth in a relatively low frequency band (e.g., 2 GHz). The user terminal 20 and each base station 12 may use a carrier of a wide bandwidth in a relatively high frequency band (e.g., 3.5 GHz, 5 GHz or 30 to 70 GHz) or may use the same carrier as that used between the user terminal 20 and the base station 11. A configuration of the frequency band used by each base station is not limited to this.

The base station 11 and each base station 12 (or the two base stations 12) can be configured to be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. The higher station apparatus 30 includes, for example, an access gateway apparatus, a Radio Network Controller (RNC) and a Mobility Management Entity (MME), yet is not limited to these. Each base station 12 may be connected with the higher station apparatus 30 via the base station 11.

The base station 11 is a base station that has a relatively wide coverage, and may be referred to as a macro base station, an aggregate node, an eNodeB (eNB) or a transmission reception point. Each base station 12 is a base station that has a local coverage, and may be referred to as a small base station, a micro base station, a pico base station, a femto base station, a Home eNodeB (HeNB), a Remote Radio Head (RRH) or a transmission reception point. The base stations 11 and 12 will be collectively referred to as a base station 10 below when not distinguished.

Each user terminal 20 is a terminal that supports various communication schemes such as LTE and LTE-A, and may include not only a mobile communication terminal but also a fixed communication terminal.

The radio communication system 1 can apply Orthogonal Frequency-Division Multiple Access (OFDMA) to Downlink (DL) and can apply Single Carrier-Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. Uplink and downlink radio access schemes are not limited to a combination of these schemes, and OFDMA may be used on UL.

The radio communication system 1 uses a downlink data channel (also referred to as, for example, a PDSCH: Physical Downlink Shared Channel or a downlink shared channel) shared by each user terminal 20, a broadcast channel (PBCH: Physical Broadcast Channel) and an L1/L2 control channel as DL channels. User data, higher layer control information and a System Information Block (SIB) are conveyed on the PDSCH. A Master Information Block (MIB) is conveyed on the PBCH.

The L1/L2 control channel includes a downlink control channel (a Physical Downlink Control Channel (PDCCH) or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (ACK/NACK) of an HARQ for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink data channel (also referred to as, for example, a PUSCH: Physical Uplink Shared Channel or an uplink shared channel) shared by each user terminal 20, an uplink control channel (PUCCH: Physical Uplink Control Channel), and a random access channel (PRACH: Physical Random Access Channel) as UL channels. User data and higher layer control information are conveyed on the PUSCH. Uplink Control Information (UCI) including at least one of transmission acknowledgement information (ACK/NACK) and radio quality information (CQI) is conveyed on the PUSCH or the PUCCH. A random access preamble for establishing connection with a cell is conveyed on the PRACH.

<Base Station>

Figure 13:
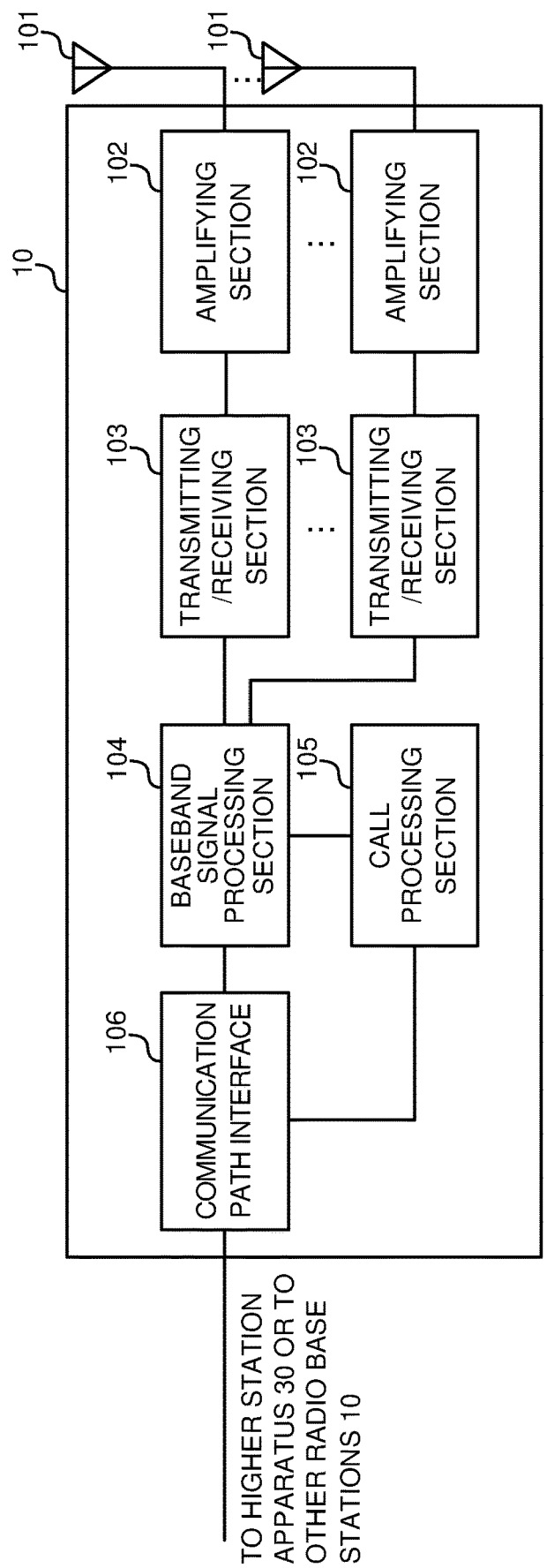
FIG. 13 is a diagram illustrating one example of a function configuration of the base station according to the present embodiment.

FIG. 13 is a diagram illustrating one example of an overall configuration of the base station according to the present embodiment. The base station 10 includes pluralities of transmission/reception antennas 101, amplifying sections 102 and transmitting/receiving sections 103, a baseband signal processing section 104, a call processing section 105 and a communication path interface 106. The base station 10 only needs to be configured to include one or more of each of the transmission/reception antennas 101, the amplifying sections 102 and the transmitting/receiving sections 103. The base station 10 may be a transmission apparatus of downlink data and a reception apparatus of uplink data.

Downlink data transmitted from the base station 10 to the user terminal 20 is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the downlink data, and transfers the downlink data to each transmitting/receiving section 103. The baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can comprise transmitters/receivers, transmission/reception circuits or transmission/reception apparatuses described based on a common knowledge in a technical field according to the present invention. The transmitting/receiving sections 103 may be configured as an integrated transmitting/receiving section or may comprise transmitting sections and receiving sections.

Each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing such as configuration and release of a communication channel, state management of the base station 10 and radio resource management.

The communication path interface 106 transmits and receives signals to and from the higher station apparatus 30 via a given interface. The communication path interface 106 may transmit and receive (backhaul signaling) signals to and from the another base station 10 via an inter-base station interface (e.g., optical fibers compliant with the Common Public Radio Interface (CPRI) or the X2 interface).

Each transmitting/receiving section 103 may further include an analog beam forming section that performs analog beam forming. The analog beam forming section can comprise an analog beam forming circuit (e.g., a phase shifter or a phase shift circuit) or an analog beam forming apparatus (e.g., a phase shifter) described based on the common knowledge in the technical field according to the present invention. Each transmission/reception antenna 101 can comprise an array antenna, for example. Each transmitting/receiving section 103 is configured to be able to apply single BF and multiple BF.

Each transmitting/receiving section 103 may transmit a signal by using a transmission beam, or may receive a signal by using a reception beam. Each transmitting/receiving section 103 may transmit and receive a signal by using a given beam determined by a control section 301.

Each transmitting/receiving section 103 transmits a downlink signal (e.g., a downlink control signal (downlink control channel), a downlink data signal (a downlink data channel or a downlink shared channel), a downlink reference signal (a DM-RS or a CSI-RS), a discovery signal, a synchronization signal or a broadcast signal). Each transmitting/receiving section 103 receives an uplink signal (e.g., an uplink control signal (uplink control channel), an uplink data signal (an uplink data channel or an uplink shared channel) or an uplink reference signal).

Each transmitting/receiving section 103 may transmit 1 or a plurality of pieces of downlink control information used to schedule the downlink shared channels transmitted from a plurality of transmission points. Each transmitting/receiving section 103 may transmit a reference signal such as a Beam Failure Detection Reference Signal (BFD-RS) and a New Candidate Beam Identification Reference Signal (NCBI-RS). Each transmitting/receiving section 103 may receive a Beam Failure Recovery reQuest (BFRQ) transmitted from the user terminal 20, and transmit a response signal to the Beam Failure Recovery reQuest (BFRQ).

A transmitting section and a receiving section according to the present invention comprise both or one of each transmitting/receiving section 103 and the communication path interface 106.

Figure 14:
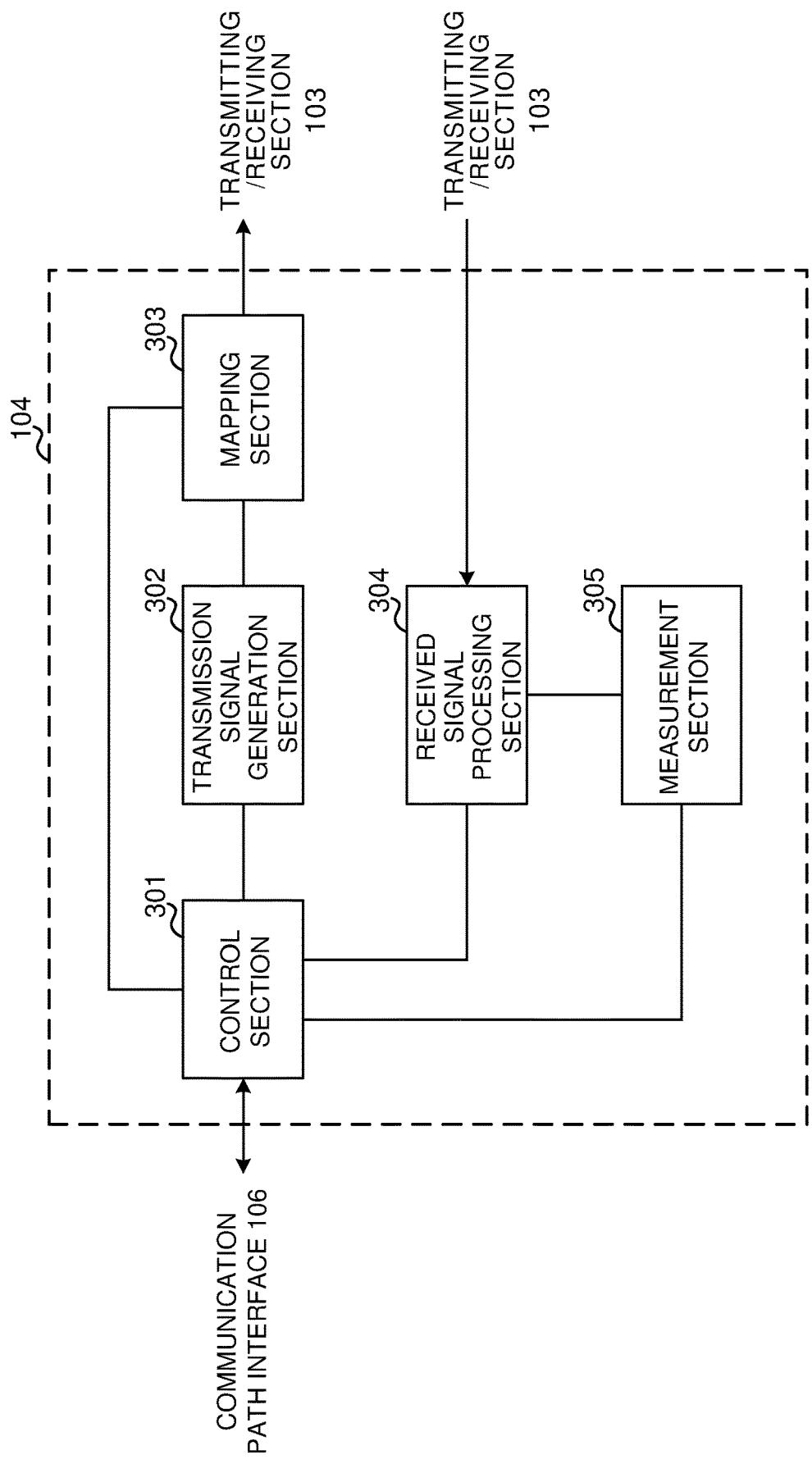
FIG. 14 is a diagram illustrating one example of a function configuration of a baseband signal processing section of the base station.

FIG. 14 is a diagram illustrating one example of a function configuration of the base station according to the present embodiment. This FIG. 14 mainly illustrates function blocks of characteristic portions according to the present embodiment, and assumes that the base station 10 includes other function blocks, too, that are necessary for radio communication. The baseband signal processing section 104 includes at least the control section 301, a transmission signal generation section 302, a mapping section 303, a received signal processing section 304 and a measurement section 305.

The control section 301 controls the entire base station 10. The control section 301 can comprise a controller, a control circuit or a control apparatus described based on the common knowledge in the technical field according to the present invention.

The control section 301 controls, for example, signal generation of the transmission signal generation section 302 and signal allocation of the mapping section 303. The control section 301 controls signal reception processing of the received signal processing section 304 and signal measurement of the measurement section 305.

The control section 301 controls scheduling (e.g., resource allocation) of the downlink signal and the uplink signal. More specifically, the control section 301 controls the transmission signal generation section 302, the mapping section 303 and each transmitting/receiving section 103 to generate and transmit DCI (a DL assignment or a DL grant) including scheduling information of a downlink data channel and DCI (UL grant) including scheduling information of an uplink data channel.

The control section 301 may control at least one of Radio Link Monitoring (RLM) and Beam Recovery (BR) for the user terminal 20. The control section 301 may perform control to transmit a response signal to the user terminal 20 in response to the Beam Failure Recovery reQuest (BFRQ).

The transmission signal generation section 302 generates a downlink signal (such as a downlink control channel, a downlink data channel or a downlink reference signal such as a DM-RS) based on an instruction from the control section 301, and outputs the downlink signal to the mapping section 303. The transmission signal generation section 302 can comprise a signal generator, a signal generating circuit or a signal generating apparatus described based on the common knowledge in the technical field according to the present invention.

The mapping section 303 maps the downlink signal generated by the transmission signal generation section 302, on given radio resources based on the instruction from the control section 301, and outputs the downlink signal to each transmitting/receiving section 103. The mapping section 303 can comprise a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. The received signal is, for example, an uplink signal (such as an uplink control channel, an uplink data channel or an uplink reference signal) transmitted from the user terminal 20. The received signal processing section 304 can comprise a signal processor, a signal processing circuit or a signal processing apparatus described based on the common knowledge in the technical field according to the present invention.

The received signal processing section 304 outputs information decoded by the reception processing to the control section 301. For example, the received signal processing section 304 outputs at least one of a preamble, control information and UL data to the control section 301. Furthermore, the received signal processing section 304 outputs the received signal and the signal after the reception processing to the measurement section 305.

The measurement section 305 performs measurement related to the received signal. The measurement section 305 can comprise a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ)) or a channel state of the received signal. The measurement section 305 may output a measurement result to the control section 301.

<User Terminal>

Figure 15:
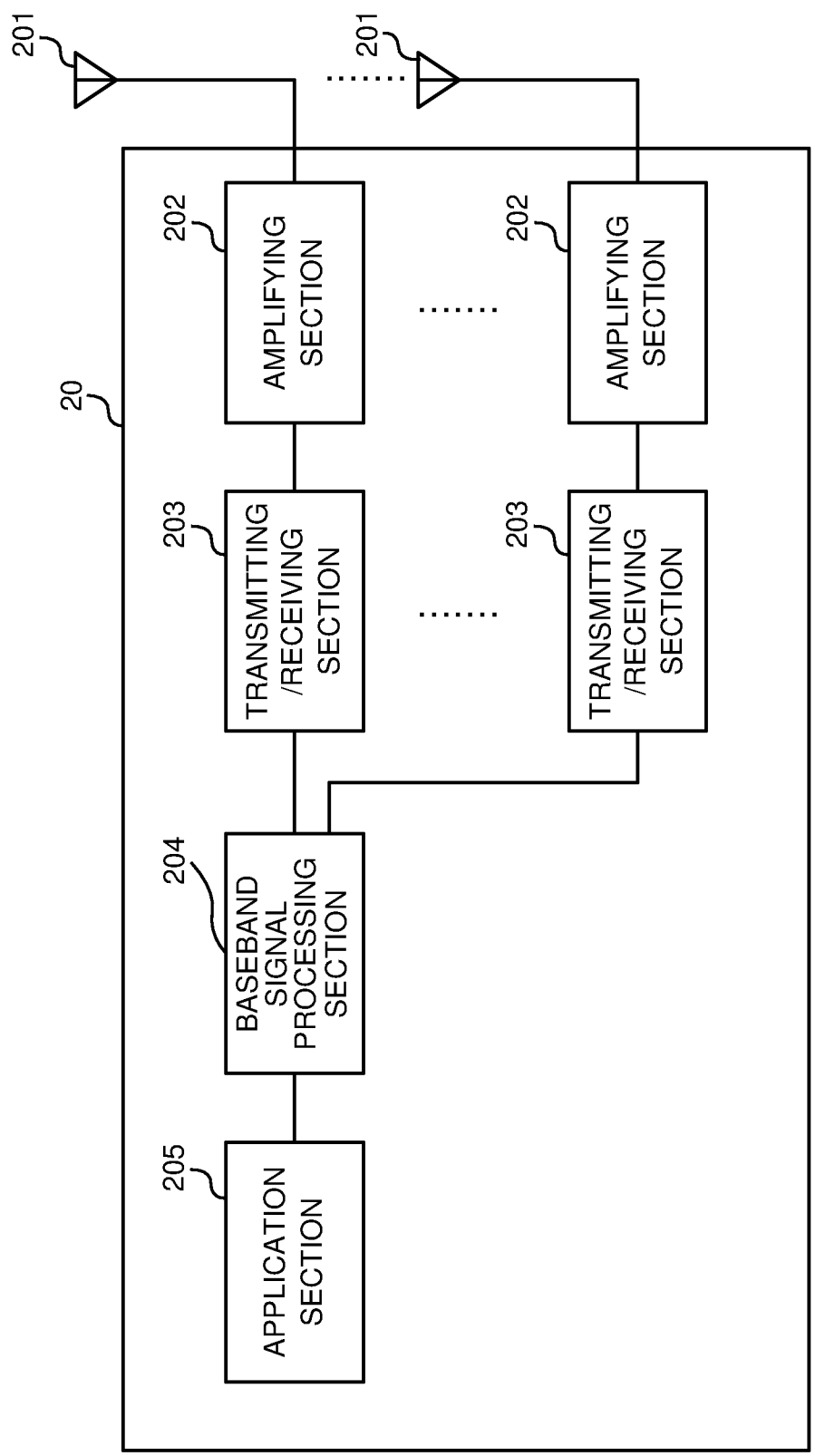
FIG. 15 is a diagram illustrating one example of a function configuration of the user terminal according to the present embodiment.

FIG. 15 is a diagram illustrating one example of an overall configuration of the user terminal according to the present embodiment. The user terminal 20 includes pluralities of transmission/reception antennas 201, amplifying sections 202 and transmitting/receiving sections 203, a baseband signal processing section 204 and an application section 205. The user terminal 20 only needs to be configured to include one or more of each of the transmission/reception antennas 201, the amplifying sections 202 and the transmitting/receiving sections 203. The user terminal 20 may be a reception apparatus of downlink data and a transmission apparatus of uplink data.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can comprise transmitters/receivers, transmission/reception circuits or transmission/reception apparatuses described based on the common knowledge in the technical field according to the present invention. The transmitting/receiving sections 203 may be configured as an integrated transmitting/receiving section or may comprise transmitting sections and receiving sections.

The baseband signal processing section 204 performs FFT processing, error correcting decoding and retransmission control reception processing on the input baseband signal. The baseband signal processing section 204 transfers downlink data to the application section 205. The application section 205 performs processing related to layers higher than a physical layer and an MAC layer. The baseband signal processing section 204 may transfer system information and higher layer control information of the downlink data, too, to the application section 205.

The application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 may further include an analog beam forming section that performs analog beam forming. The analog beam forming section can comprise an analog beam forming circuit (e.g., a phase shifter or a phase shift circuit) or an analog beam forming apparatus (e.g., a phase shifter) described based on the common knowledge in the technical field according to the present invention. Each transmission/reception antenna 201 can comprise an array antenna, for example. Each transmitting/receiving section 203 is configured to be able to apply single BF and multiple BF.

Each transmitting/receiving section 203 may transmit a signal by using a transmission beam, or may receive a signal by using a reception beam. Each transmitting/receiving section 203 may transmit and receive a signal by using a given beam determined by a control section 401.

Each transmitting/receiving section 203 receives the downlink signal (e.g., the downlink control signal (downlink control channel), the downlink data signal (the downlink data channel or the downlink shared channel), the downlink reference signal (the DM-RS or the CSI-RS), the discovery signal, the synchronization signal or the broadcast signal). Each transmitting/receiving section 203 receives the uplink signal (e.g., the uplink control signal (uplink control channel), the uplink data signal (the uplink data channel or the uplink shared channel) or the uplink reference signal).

Each transmitting/receiving section 203 may receive 1 or a plurality of pieces of downlink control information used to schedule the downlink shared channels transmitted from a plurality of transmission points. Each transmitting/receiving section 203 may receive the reference signal such as the Beam Failure Detection Reference Signal (BFD-RS) and the New Candidate Beam Identification Reference Signal (NCBI-RS). Each transmitting/receiving section 203 may transmit the Beam Failure Recovery reQuest (BFRQ), and receive the response signal to the Beam Failure Recovery reQuest (BFRQ).

Figure 16:
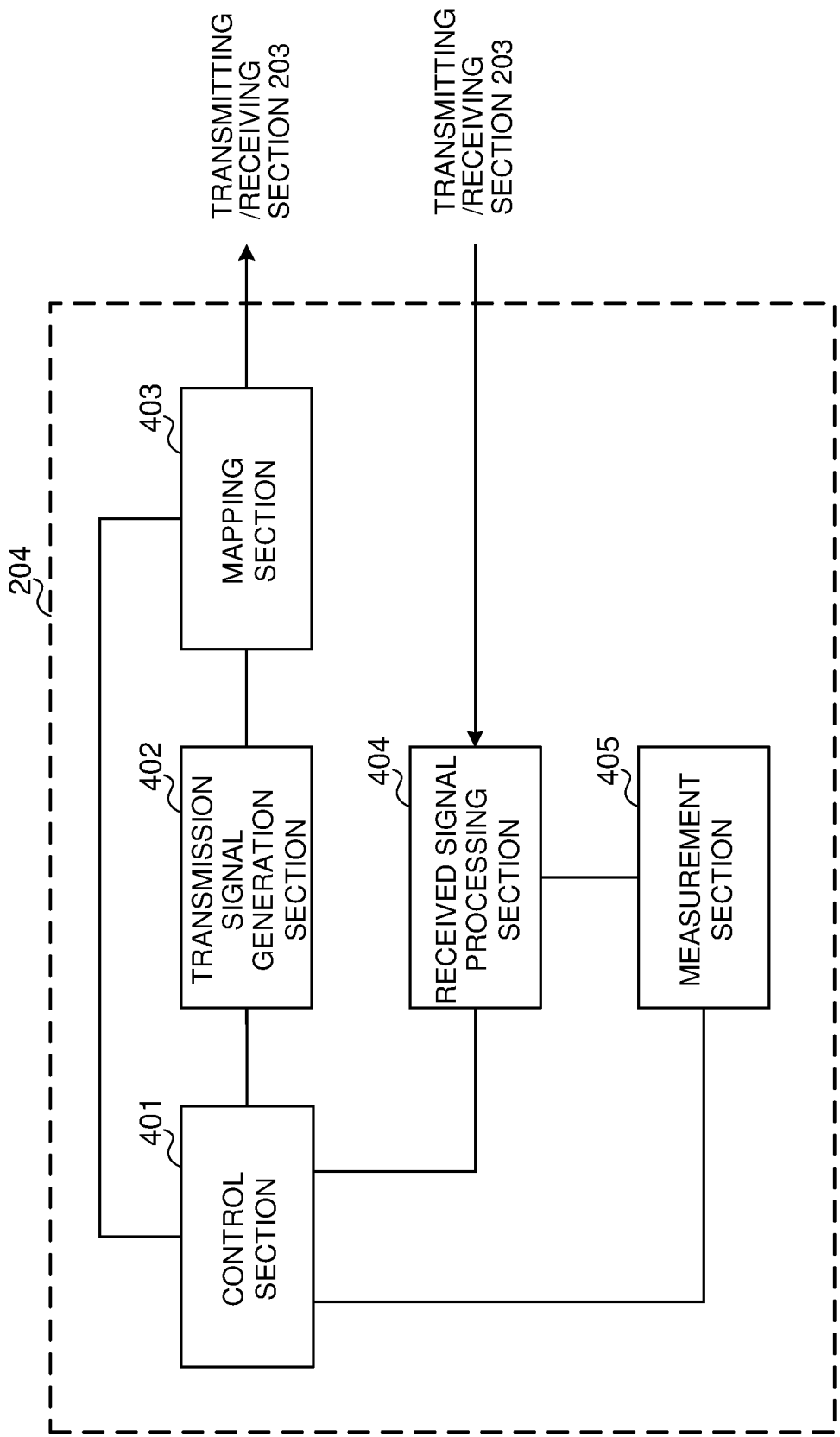
FIG. 16 is a diagram illustrating one example of a function configuration of a baseband signal processing section of the user terminal.

FIG. 16 is a diagram illustrating one example of a function configuration of the user terminal according to the present embodiment. This FIG. 16 mainly illustrates function blocks of characteristic portions according to the present embodiment, and assumes that the user terminal 20 includes other function blocks, too, that are necessary for radio communication. The baseband signal processing section 204 of the user terminal 20 includes at least the control section 401, a transmission signal generation section 402, a mapping section 403, a received signal processing section 404 and a measurement section 405.

The control section 401 controls the entire user terminal 20. The control section 401 can comprise a controller, a control circuit or a control apparatus described based on the common knowledge in the technical field according to the present invention.

The control section 401 controls, for example, signal generation of the transmission signal generation section 402 and signal allocation of the mapping section 403. The control section 401 controls signal reception processing of the received signal processing section 404 and signal measurement of the measurement section 405.

The control section 401 may detect a beam failure of a Transmission Reception Point (TRP) associated with a Beam Failure Detection Reference Signal (BFD-RS). The control section 401 may measure a new candidate beam of a Transmission Reception Point (TRP) associated with a New Candidate Beam Identification Reference Signal (NCBI-RS). The control section 401 may perform control to transmit the Beam Failure Recovery reQuest (BFRQ) to the Transmission Reception Point (TRP).

The transmission signal generation section 402 generates an uplink signal (such as an uplink control channel, an uplink data channel or an uplink reference signal) based on an instruction from the control section 401, and outputs the uplink signal to the mapping section 403. The transmission signal generation section 402 can comprise a signal generator, a signal generating circuit or a signal generating apparatus described based on the common knowledge in the technical field according to the present invention.

The transmission signal generation section 402 generates an uplink data channel based on the instruction from the control section 401. When, for example, the downlink control channel notified from the base station 10 includes a UL grant, the transmission signal generation section 402 is instructed by the control section 401 to generate an uplink data channel.

The mapping section 403 maps the uplink signal generated by the transmission signal generation section 402, on radio resources based on the instruction from the control section 401, and outputs the uplink signal to each transmitting/receiving section 203. The mapping section 403 can comprise a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. The received signal is, for example, a downlink signal (such as a downlink control channel, a downlink data channel or a downlink reference signal) transmitted from the base station 10. The received signal processing section 404 can comprise a signal processor, a signal processing circuit or a signal processing apparatus described based on the common knowledge in the technical field according to the present invention. The received signal processing section 404 can constitute the receiving section according to the present invention.

The received signal processing section 404 blind-decodes the downlink control channel for scheduling transmission and reception of the downlink data channel based on an instruction of the control section 401, and performs reception processing on the downlink data channel based on the DCI. The received signal processing section 404 estimates a channel gain based on the DM-RS or the CRS, and demodulates the downlink data channel based on the estimated channel gain.

The received signal processing section 404 outputs information decoded by the reception processing to the control section 401. The received signal processing section 404 outputs, for example, broadcast information, system information, an RRC signaling and DCI to the control section 401. The received signal processing section 404 may output a data decoding result to the control section 401. The received signal processing section 404 outputs the received signal and the signal after the reception processing to the measurement section 405.

The measurement section 405 performs measurement related to the received signal. The measurement section 405 can comprise a measurement instrument, a measurement circuit or a measurement apparatus described based on the common knowledge in the technical field according to the present invention.

The measurement section 405 may measure, for example, received power (e.g., RSRP), DL received quality (e.g., RSRQ) or a channel state of the received signal. The measurement section 405 may output a measurement result to the control section 401.

(Hardware Configuration)

The block diagrams used to describe the above embodiments illustrate blocks in function units. These function blocks (components) are realized by an arbitrary combination of at least one of hardware and software. A method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit or a transmitter. As described above, the method for realizing each function block is not limited in particular.

Figure 17:
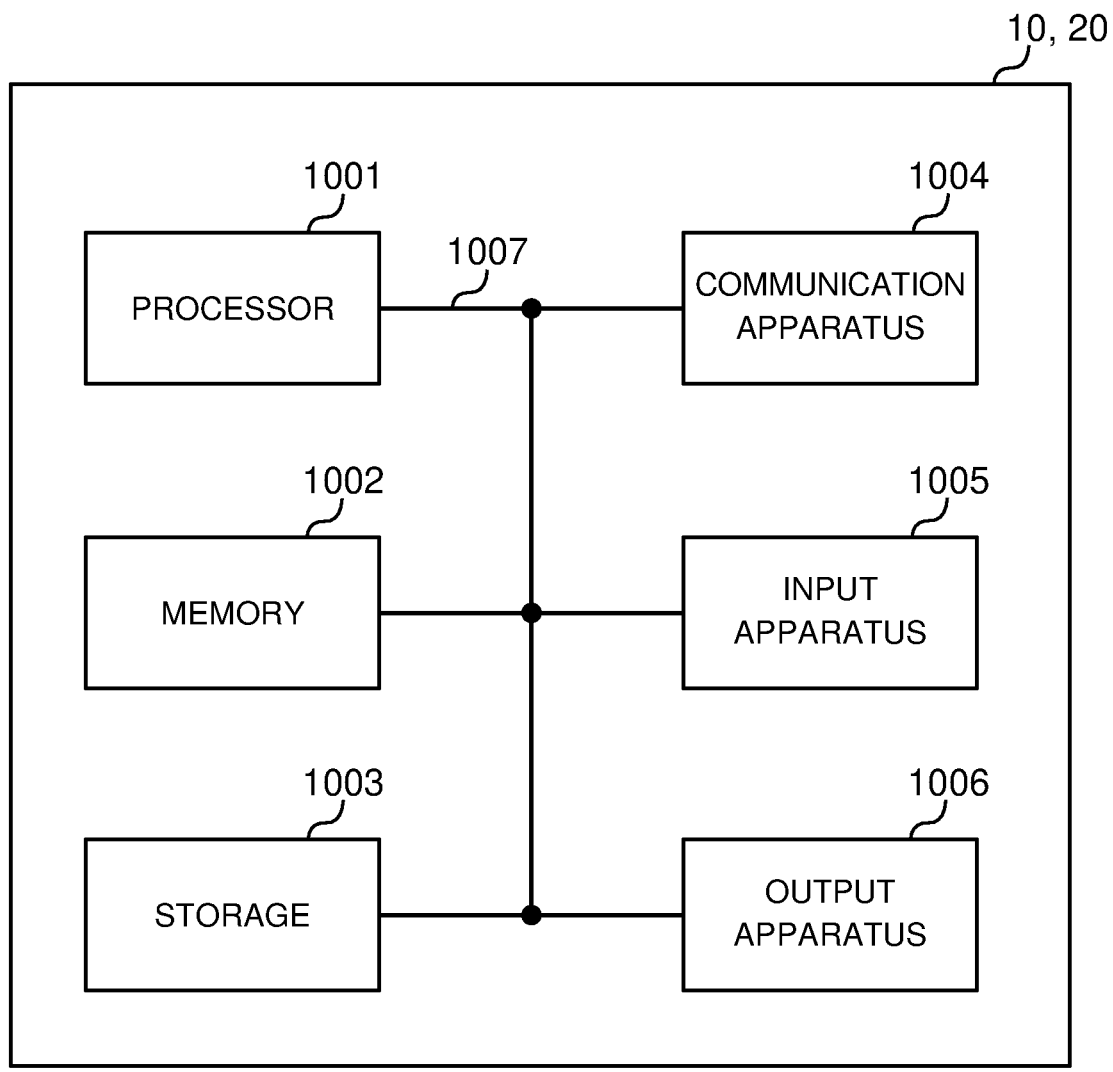
FIG. 17 is a diagram illustrating one example of hardware configurations of the base station and the user terminal according to the one embodiment of the present invention.

For example, the base station and the user terminal according to the one embodiment of the present disclosure may function as computers that perform processing of the radio communication method according to the present disclosure. FIG. 17 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

A word "apparatus" in the following description can be read as a circuit, a device or a unit. The hardware configurations of the base station 10 and the user terminal 20 may be configured to include one or a plurality of apparatuses illustrated in FIG. 17 or may be configured without including part of the apparatuses.

For example, FIG. 17 illustrates the only one processor 1001. However, there may be a plurality of processors. Processing may be executed by 1 processor or processing may be executed by 2 or more processors concurrently or successively or by using another method. The processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may comprise a Central Processing Unit (CPU) including an interface for a peripheral apparatus, a control apparatus, an operation apparatus and a register. For example, the above-described baseband signal processing section 104 (204) and call processing section 105 may be realized by the processor 1001.

The processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may comprise at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may comprise at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 may be physically or logically separately implemented as a transmitting section 103a and a receiving section 103b.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. The input apparatus 1005 and the output apparatus 1006 may be an integrated component (e.g., touch panel).

Each apparatus such as the processor 1001 or the memory 1002 is connected by the bus 1007 that communicates information. The bus 1007 may be a single bus or may be buses different for different apparatuses.

The base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these types of hardware.

Modified Example

Each term that has been described in the present disclosure and each term that is necessary to understand the present disclosure may be replaced with terms having identical or similar meanings. For example, at least one of a channel and a symbol may be a signal (signaling). A signal may be a message. A reference signal can be also abbreviated as an RS (Reference Signal), or may be referred to as a pilot or a pilot signal depending on standards to be applied. A Component Carrier (CC) may be referred to as a cell, a frequency carrier and a carrier frequency.

A radio frame may include one or a plurality of durations (frames) in a time domain. Each of one or a plurality of durations (frames) that constitutes a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. The slot may be a time unit based on the numerologies.

The slot may include a plurality of mini slots. Each mini slot may include one or a plurality of symbols in the time domain. The mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. A unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. A definition of the TTI is not limited to this.

The TTI may be a transmission time unit of a channel-coded data packet (transport block), code block or codeword, or may be a processing unit of scheduling or link adaptation. When the TTI is given, a time period (e.g., the number of symbols) in which a transport block, a code block or a codeword is actually mapped may be shorter than the TTI.

When 1 slot or 1 mini slot is referred to as a TTI, 1 or more TTIs (i.e., 1 or more slots or 1 or more mini slots) may be a minimum time unit of scheduling. The number of slots (the number of mini slots) that constitute a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

The long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain.

The RB may include one or a plurality of symbols in the time domain or may have the length of 1 slot, 1 mini slot, 1 subframe or 1 TTI. 1 TTI or 1 subframe may each include one or a plurality of resource blocks.

One or a plurality of RBs may be referred to as a Physical Resource Block (PRB: Physical RB), a Sub-Carrier Group (SCG), a Resource Element Group (REG), a PRB pair or an RB pair.

The resource block may include one or a plurality of Resource Elements (REs). For example, 1 RE may be a radio resource domain of 1 subcarrier and 1 symbol.

Structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

The information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

The information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspects/embodiments described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

The physical layer signaling may be referred to as Layer 1/Layer 2 (L1/L2) control information (L1/L2 control signal) or L1 control information (L1 control signal). The RRC signaling may be referred to as an RRC message, and may be, for example, an RRCConnectionSetup message or an RRCConnectionReconfiguration message. The MAC signaling may be notified by using, for example, an MAC Control Element (MAC CE).

Notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "precoding", a "precoder", a "weight (precoding weight)", "Quasi-Co-Location (QCL)", "transmission power", "phase rotation", an "antenna port", an "antenna port group", a "layer", "the number of layers", a "rank", a "beam", a "beam width", a "beam angle", an "antenna", an "antenna element" and a panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "transmission/reception point", a "cell", a "sector", a "cell group", a "carrier", a "component carrier" and a "Bandwidth Part (BWP)" can be interchangeably used. The base station is also referred to as terms such as a macro cell, a small cell, a femtocell or a picocell.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a communication apparatus. At least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). At least one of the base station and the mobile station includes an apparatus, too, that does not necessarily move during a communication operation. For example, at least one of the base station and the mobile station may be an Internet of Things (IoT) device such as a sensor.

The base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

"Deciding (determining)" may be regarded to "decide (determine)" receiving (e.g., receiving information), transmitting (e.g., transmitting information), input, output and accessing (e.g., accessing data in a memory).

"Deciding (determining)" may be regarded to "decide (determine)" resolving, selecting, choosing, establishing and comparing. That is, "deciding (determining)" may be regarded to "decide (determine)" some operation.

"Deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". Words such as "separate" and "coupled" may be also interpreted in a similar manner.

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a receiver that receives, from a plurality of transmission reception points (TRPs), respectively, a plurality of first reference signals for beam failure detection; and
   a processor that detects a beam failure of one TRP among the plurality of TRPs based on one of the first reference signals,
   wherein the one TRP is associated with the one of the first reference signals and the one of the first reference signals is transmitted from the one TRP, and
   indexes of the first reference signal have respectively same values as indexes indicated by a Transmission Configuration Indicator (TCI) state.

2. The terminal according to claim 1, wherein:
   the receiver receives a second reference signal for detecting a new candidate beam, the second reference signal being associated with only the one TRP; and
   the processor measures the new candidate beam of the one TRP associated with the second reference signal.

3. The terminal according to claim 2, wherein the processor controls to transmit a beam failure recovery request to the one TRP.

4. The terminal according to claim 1, wherein the processor controls to transmit a beam failure recovery request to the one TRP.

5. A radio communication method for a terminal comprising:
   receiving, from a plurality of transmission reception points (TRPs), respectively, a plurality of first reference signals for beam failure detection; and
   detecting a beam failure of one TRP among the plurality of TRPs based on one of the first reference signals,
   wherein the one TRP is associated with the one of the first reference signals and the one of the first reference signals is transmitted from the one TRP, and
   indexes of the first reference signal have respectively same values as indexes indicated by a Transmission Configuration Indicator (TCI) state.

6. A system comprising a plurality of transmission reception points (TRPs) and a terminal, wherein
   the plurality of TRPs comprises:
      a transmitter that transmits a plurality of first reference signals for beam failure detection, and
   the terminal comprises:
      a receiver that receives, from the plurality of TRPs, respectively, the plurality of first reference signals; and
      a processor that detects a beam failure of one TRP among the plurality of TRPs based on one of the first reference signals,
      wherein the one TRP is associated with the one of the first reference signals and the one of the first reference signals is transmitted from the one TRP, and
   wherein indexes of the first reference signal have respectively same values as indexes indicated by a Transmission Configuration Indicator (TCI) state.

* * * * *